(12) United States Patent
Wu et al.

(10) Patent No.: US 8,326,042 B2
(45) Date of Patent: Dec. 4, 2012

(54) VIDEO SHOT CHANGE DETECTION BASED ON COLOR FEATURES, OBJECT FEATURES, AND RELIABLE MOTION INFORMATION

(75) Inventors: Weiguo Wu, Beijing (CN); Takayuki Yoshigahara, Tokyo (JP); Bo Han, Beijing (CN); Yichuan Hu, Beijing (CN)

(73) Assignee: Sony (China) Limited, Beijing (CN)

( * ) Notice: Subject to any disclaimer, the term of this patent is extended or adjusted under 35 U.S.C. 154(b) by 1206 days.

(21) Appl. No.: 12/139,915

(22) Filed: Jun. 16, 2008

(65) Prior Publication Data

US 2008/0310727 A1 Dec. 18, 2008

(30) Foreign Application Priority Data

Jun. 18, 2007 (CN) .......................... 2007 1 0110779
Feb. 28, 2008 (CN) .......................... 2008 1 0009385

(51) Int. Cl.
*G06K 9/46* (2006.01)

(52) U.S. Cl. ...................................... 382/190; 348/700

(58) Field of Classification Search ........................ None
See application file for complete search history.

(56) References Cited

U.S. PATENT DOCUMENTS

| 5,436,674 A * | 7/1995 | Hirabayashi et al. ......... 348/699 |
| 6,393,054 B1 * | 5/2002 | Altunbasak et al. .......... 375/240 |
| 2004/0204919 A1 * | 10/2004 | Li .................................. 702/189 |

OTHER PUBLICATIONS

Chen et al. (2004) "A decision tree-based multimodal data mining framework for soccer goal detection." Proc. 2004 IEEE Int'l Conf. on Multimedia and Expo, vol. 1 pp. 265-268.*
Chen et al. (Aug. 2001) "Video scene change detection method using unsupervised segmentation and object tracking." Proc. 2001 IEEE Int'l Conf. on Multimedia and Expo, pp. 56-59.*
Duan et al. (Jan. 2003) "Semantic shot classification in sports video." SPIE vol. 5021, pp. 300-313.*
Ekin et al. (2003) "Generic play-break event detection for summarization and hierarchical sports video analysis." Proc. 2003 IEEE Int'l Conf. on Multimedia and Expo, vol. 1 pp. 169-172.*
Kim et al. (2000) "Efficient camera motion characterization for MPEG video indexing." Proc. 2000 IEEE Int'l Conf. on Multimedia and Expo, vol. 2 pp. 1171-1174.*

(Continued)

*Primary Examiner* — Barry Drennan
(74) *Attorney, Agent, or Firm* — Oblon, Spivak, McClelland, Maier & Neustadt, L.L.P.

(57) ABSTRACT

The present invention provides a moving image analyzing apparatus, method and system. The moving image analyzing apparatus comprises a moving image reading means for reading a moving image, a region-of-interest extracting means for extracting a region-of-interest from each frame in the moving image, an object feature extracting means for extracting an object feature in the region-of-interest or a region adjacent to the region-of-interest, and a shot change detecting means for detecting a shot change on the basis of the color feature of image, the object feature of the region-of-interest, and the differences of the motion information among the images of each frame. By estimating the reliability of the motion information within an image, the present invention can eliminate the shot change which is incorrectly detected according to the color distribution feature and the dimensional feature of the region-of-interest, thereby improving the detection accuracy of shot change.

19 Claims, 32 Drawing Sheets

OTHER PUBLICATIONS

Leonardi et al. (May 2004) "Semantic indexing of soccer audiovisual sequences: a multimodal approach based on controlled Markov chains." IEEE Trans. on Circuits and Systems for Video Technology, vol. 14 No. 5, pp. 634-643.*

Hu et al. (Jul. 2007) "Enhanced shot change detection using motion features for soccer video analysis." Proc. 2007 IEEE Int'l Conf. on Multimedia and Expo, pp. 1555-1558.*

Han et al. (Aug. 2007) "Enhanced sports video shot boundary detection based on middle level features and a unified model." IEEE Trans. on Consumer Electronics, vol. 53 No. 3, pp. 1168-1176.*

R. Fablet, et al. "Statistical motion-based object indexing using optic flow field" IEEE, XP-10533076A, 2000, pp. 287-290.

Ling-Yu Duan, et al. "Foreground Segmentation Using Motion Vectors in Sports Video" Laboratories for Information Technology, Agency for Science, Technology and Research, XP-002509685, 2002, pp. 751-758.

Ahmet Ekin, et al. "Automatic Soccer Video Analysis and Summarization" IEEE Transactions on Image Processing, vol. 12, No. 7, XP11074413A, Jul. 2003, pp. 796-807.

Masaru Sugano, et al. "High-Level Soccer Indexing on Low Level Feature Space" 2004 International Conference on Image Processing (ICIP), IEEE, XP-10786069A, 2004, pp. 1625-1628.

Shu-Ching Chen, et al. "Exciting Event Detection Using Multi-Level Multimodal Descriptors and Data Classification" Proceedings of the Eighth IEEE International Symposium of Multimedia (ISM'06), IEEE Computer Society, XP-31041782A 2006, 8 pages.

Jürgen Assfalg, et al. "Semantic annotation of soccer videos: automatic highlights identification" Elsevier, Computer Vision and Image Understanding 92, XP-4472303A, 2003, pp. 285-305.

* cited by examiner example of the production of MMV shield

VIDEO SHOT CHANGE DETECTION BASED ON COLOR FEATURES, OBJECT FEATURES, AND RELIABLE MOTION INFORMATION

BACKGROUND OF THE INVENTION

1. Field of the Invention

The present invention relates to a technology of extracting and analyzing digital information, in particular, to an extracting and analyzing apparatus, method and system for moving image.

2. Description of the Related Art

With the rapid developments of the digitalization technologies in many fields such as Internet technology, broadcasting, communication, entertainment, healthcare and education, one of the most common memory means is to store video/sound data in the form of multimedia information. Consequently, the requirement that only necessary information among massive multimedia information can be accessed easily and quickly becomes stricter. Meanwhile, to comply with the requirement of managing and handling efficiently the massive video/sound data stored in the internet or family servers, the image detection technology used for extracting and analyzing the meaning of video/sound content is developing actively.

For example, the technologies as follows are under development. As an example, in the case of hard-disk video-recording devices and digital appliances popularized, there is a "similar image searching technology" in the entertainment form corresponding to the new lifestyle, which is used for allowing the user to watch only what he or she wants to watch or allowing the user to enjoy displaying a video at the same time of recording; with the popularization of the digital camera, the digital video camera and the Internet, there is an "digest video producing technology" which is used for simply editing a variety of images and moving images as well as producing and storing a self-made digest video. In addition, in order to meet the requirements for the image search, the image search technology using keywords developed by Google or the like is employed in practice. There are also Browsing technology which is capable of freely going through moving images, the producing technology for "video conference record" and the like.

However, in the image technology using keywords, designating necessary keywords needs labor and time, and moreover it tends to bring out a great deal of images with the same keyword. As a result, in practice, satisfactory search results can not be obtained. Additionally, upon studying many search technologies where Meta information is automatically extracted from the video and the desired images are found according to the Meta information as well as the technology for automatically producing "video conference record", Browsing technology and so on, difficulties are found in terms of extracting the necessary features in images in a manner of high accuracy, exactly detecting and classifying the shot, automatically producing a digest, and automatically extracting exciting scenes. Therefore, the prior art does not provide the applicable video searching technology, digest producing technology and Browsing technology.

Therefore, there is also a general video analyzing technology which handle the content in image based on one's intuition rather than on the image search with keyword so as to more effectively manage and handle the content in image. The relevant technologies may be referred to JP 2002-344872 and JP 2006-54622.

However, particularly in extracting exciting scenes in moving image and producing a digest, the following detection errors of shot change often take place: the background color distribution feature is changed due to the video camera movement at a high speed and/or the object movement at a high speed; occasionally the content which is essentially not a shot change is detected as a shot change; occasionally it is difficult to distinguish the changes in the color distribution feature and the region-of-interest feature between the long shot and the medium shot, resulting in the incapability of detecting the content which should be a shot change.

SUMMARY OF THE INVENTION

The object of the present invention is to address the above problems raised in the prior art, i.e., to provide a moving image analyzing apparatus and method such that even if the background color distribution feature is changed due to the high speed movement of the video camera or the object, the shot change can be detected correctly.

Another object of the present invention is to provide a moving image analyzing apparatus and method such that even when dealing with the changes such as the long shot, the medium shot and the like, the shot change can be still detected correctly.

In addition, the further object of the present invention is to provide a digest automatic producing system which can automatically produces a digest using the moving image analyzing apparatus and to provide an exciting scene automatic extracting system which can automatically extract an exciting scene using the moving image analyzing apparatus.

The moving image analyzing apparatus according to the first aspect of the present invention comprises a moving image reading means for reading a moving image, a region-of-interest extracting means for extracting a region-of-interest from each frame in the moving image, an object feature extracting means for extracting an object feature in the region-of-interest or a region adjacent thereto, and a shot change detecting means for detecting a shot change according to the differences of the image color feature of the moving image, the object feature of the region-of-interest, and motion information among the images of each frame.

The moving image analyzing method according to the second aspect of the present invention comprises a moving image reading step of reading a moving image, a region-of-interest extracting step of extracting a region-of-interest from each frame in the moving image, an object feature extracting step of extracting an object feature in the region-of-interest or a region adjacent thereto, and a shot change detecting step of detecting a shot change on the basis of the color feature of the moving image, the object feature of the region-of-interest, and motion information among the images of each frame.

The digest automatic producing system according to the third aspect of the present invention comprises the above-mentioned moving image analyzing apparatus and a digest automatic producing means for automatically producing a digest on the basis of the analysis result by the moving image analyzing apparatus.

The exciting scene extracting system according to the fourth aspect of the present invention comprises the above-mentioned moving image analyzing apparatus and an exciting scene automatic extracting means for automatically extracting an exciting scenes on the basis of the analysis result by the moving image analyzing apparatus.

The technical effects of the present invention lie in the following facts. The shot change which is incorrectly detected according to the color distribution feature and the dimensional feature of the region-of-interest can be eliminated by estimating the reliability of the motion information within the image so as to improve the detection accuracy of shot change. Moreover, according to the present invention, it is possible to extract the image feature with high accuracy, correctly classify the shots, automatically produce the digest, and extract the exciting scenes.

BRIEF DESCRIPTION OF THE DRAWINGS

FIGS. 5(a) and 5(b) illustrate 3D HSV histograms used for detecting the playfield in the moving image such as soccer game, wherein FIG. 5(a) illustrates the representative image samples of the soccer game, and FIG. 5(b) is an diagram illustrating the projections of the 3D HSV histogram of the image samples on the respective 1Ds.

FIGS. 8(a) to 8(c) show the detection results of the playfield-of-interest by using the above HSV histogram model, wherein FIG. 8(a) illustrates the method of detecting the dominant color by using the HSV histogram, FIG. 8(b) illustrates image samples, and FIG. 8(c) illustrates the detection results of the dominant color region.

FIGS. 14(a) and 14(b) illustrate the detection result of goal by using the above method, wherein FIG. 14(a) illustrates the image samples and FIG. 14(b) illustrates the detection result of goal.

FIGS. 31(a) to 31(c) illustrate the result that the shot change is detected by the above method, wherein FIG. 31(a) illustrates the incorrect detection; FIG. 31(b) illustrates the shot change in progress, i.e., the image erase, and FIG. 31(c) illustrates the shot change in progress, i.e., the shot explosion.

DESCRIPTION OF THE PREFERRED EMBODIMENTS

Figure 1:
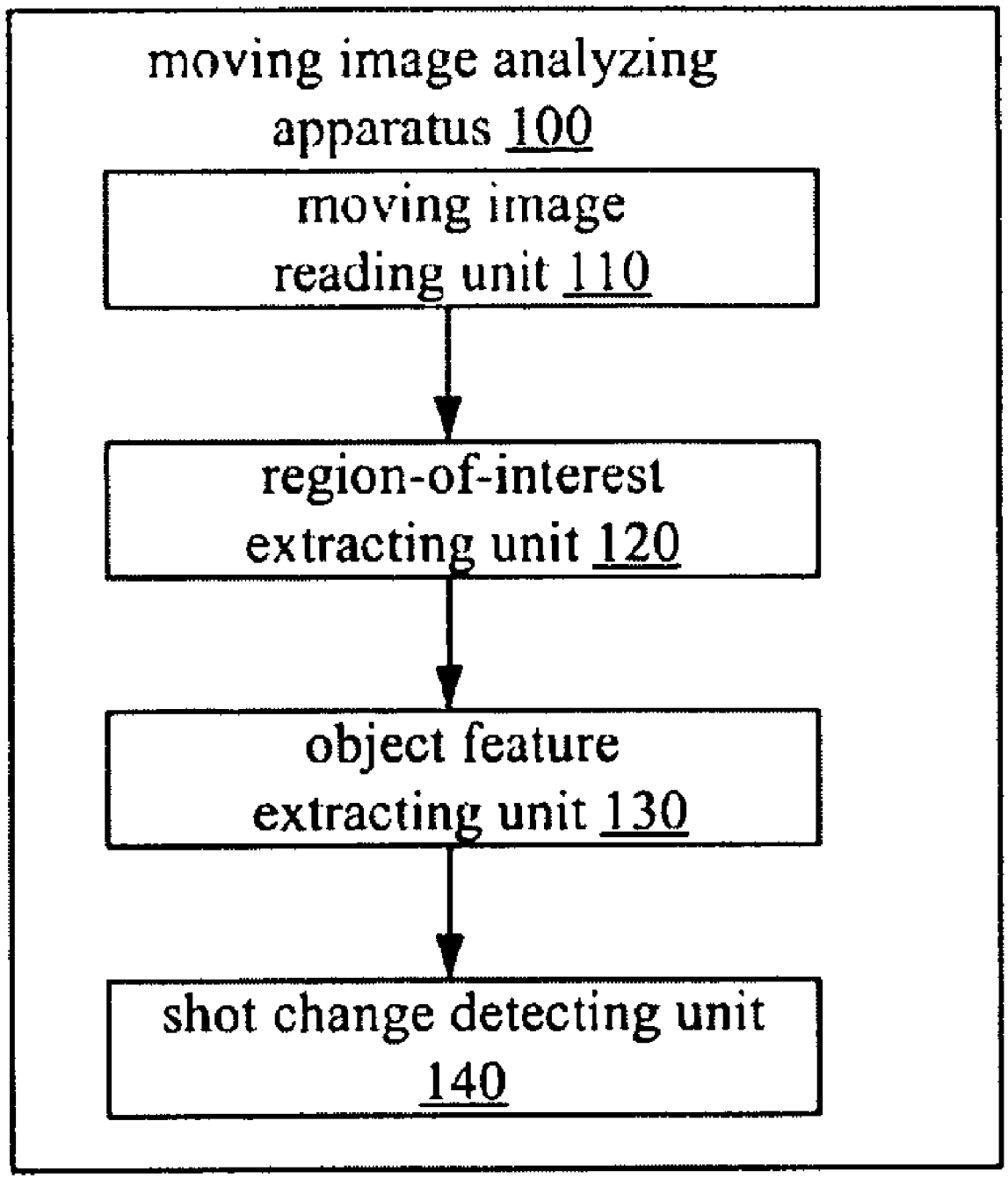
FIG. 1 is a block diagram of the first embodiment of the moving image analyzing apparatus according to the present invention.

In order to effectively manage and conveniently handle the massive video content stored in web, home server and the like, it becomes increasingly important to analyze the content of the moving image and extract its meaning as well as to assign meta information. Meanwhile, there is an increasing need for analyzing a sports match and the like, extracting the most exciting scenes, and automatically producing a digest, however, it can not be realized with a high accuracy now. Therefore, considering the abovementioned technical problems, the present invention has proposed a shot change detection technology developed as the dominant technology for the moving image analysis, and applied the technology to extracting exciting scenes in a sports match and the like and automatically producing a digest and the like. Hereinafter, a description will be made with a soccer game as the example. However, it should be indicated that the following embodiments are only the preferable embodiments of the present invention which are not intended to limit the present invention, and the present invention may be used to analyze any kind of moving image.

Generally speaking, the method for processing an image feature varies, to a great extent, depending on different video content. Therefore, the present invention is focused on the "moving image analyzing" technology frequently used in practice, so as to develop the dominant technology and structure for extracting the exciting scenes in the moving images and producing a digest. Specifically, in analyzing the video of a soccer game and the like, the image features in each frame of image are analyzed, and then by using the image features (for example, a HSV histogram model) of the region-of-interest (for example, a soccer playfield) which are obtained in advance through a pre-training, it is determined whether these images include the region-of-interest, and in the case of no region-of-interest included, it is determined as an outside moving image (exterior moving image), whereas in the case of the region-of-interest included, said region is detected reliably. In addition, the content obtained by combining the color feature of the image and the region-of-interest is used as the feather for estimating the similarity of the features between images, and in the case that the features are significantly different, it is detected as a shot change (shot switch point).

On the other hand, as described in the background art, in practice, the following errors in the shot change detection arise frequently. That is, color distribution feature of the background is changed due to the video camera's high speed moving and/or the object's high speed moving; sometimes the content which is essentially not a shot change is detected as a shot change; sometimes it is difficult to distinguish the changes in the color distribution feature and the region-of-interest features between the long shot and the medium shot, resulting in the incapability of detecting the content which should be a shot change.

Therefore, in the present invention, in order to reduce the errors in the above-described shot change detection and enhance the accuracy of the shot change detection above-described, in addition to make use of the above color distribution feature and the color feature in region-of-interest, the motion information is utilized as well. Specifically, (1) calculating error estimation values by using the block matching between two adjacent frames;

(2) with the error estimation values, performing a fitting processing by using a quadric model to estimate the parameters of the quadric model;

(3) comparing the parameters with the result obtained though pre-training, so as to detect only reliable motion information;

(4) for the reliable motion information, detecting the motion information with a higher reliability through a statistic processing on a certain time axis;

(5) by using the motion information with a higher reliability, it is possible to correctly detect the incorrectly detected content caused by the color distribution feature and the region-of-interest feature or the un-detected shot change;

(6) as to the video camera's high speed moving and the object's moving, it is possible to produce such a moving region through training and further to improve the shot change detection errors and the like caused by the video camera's high speed moving by use of the moving region as the moving region is mostly located in the vicinity of the center of the image.

In the present invention, the shot change is detected by using the color distribution feature, the object feature in the region-of-interest, and the motion information, and the image color distribution feature, the object feature in the region-of-interest, and the motion information are compared between two adjacent frames. If the comparison results are similar, it is determined that these two adjacent frames belong to a same shot, that is, there is no shot change between these two frames, whereas if the result is that there is a difference in the color feature, the object feature in the region-of-interest, and the motion information between the two adjacent frames, it is determined that these two frames do not belong to a same shot, that is, there is a shot change between these two frames, and furthermore, by using the object feature in the region-of-interest, each shot obtained by the detected shot change is classified, wherein the shots are classified into four shot types such as the long shot, the medium shot (middle shot), the close shot (zoom-up shot) and the out-of-field shot (outside shot) with the long shot, the medium shot and the close shot being as the indoor shot and the out-of-field shot being as the outside shot.

Furthermore, by adding the above feature and the shot change detection result as the comment information of the image, the present invention can be applied to the exciting scene extraction and the digest production in a soccer game.

Hereinafter, embodiments of the present invention are described in detail with reference to the accompanying drawings.

FIG. 1 is the block diagram showing the first embodiment of the moving image analyzing apparatus of the present invention. As shown in FIG. 1, the moving image analyzing apparatus 100 comprises a moving image reading unit 110 for reading a moving image, and particularly for reading a game video sequence in a soccer game, an region-of-interest extracting unit 120 for extracting a region-of-interest from each image in the read moving image (for example, a moving image in a soccer game playfield), an object feature extracting unit 130 for extracting an object feather in the region-of-interest or a region adjacent thereto, for example, in a soccer game, the object feature is a player's face, the goal region, the soccer game, the corner kick position, the playfield region or other profile, and a shot change detecting unit 140 for detecting a shot change on the basis of the differences of the color feature of the moving image/the object feature of the region-of-interest, and motion information among the images of each frame.

Meanwhile, by using an image feature of region-of-interest obtained through pre-training, the region-of-interest extracting unit 120 determines whether the region-of-interest (e.g. the playfield for a soccer game) is present in each frame. After extracting the region-of-interest by the region-of-interest extracting unit 120, the object feature extracting unit 130 automatically extracts the object feature in the region-of-interest or the region adjacent thereto. The object feature of the region-of-interest is based on the HSV histogram.

Figure 2:
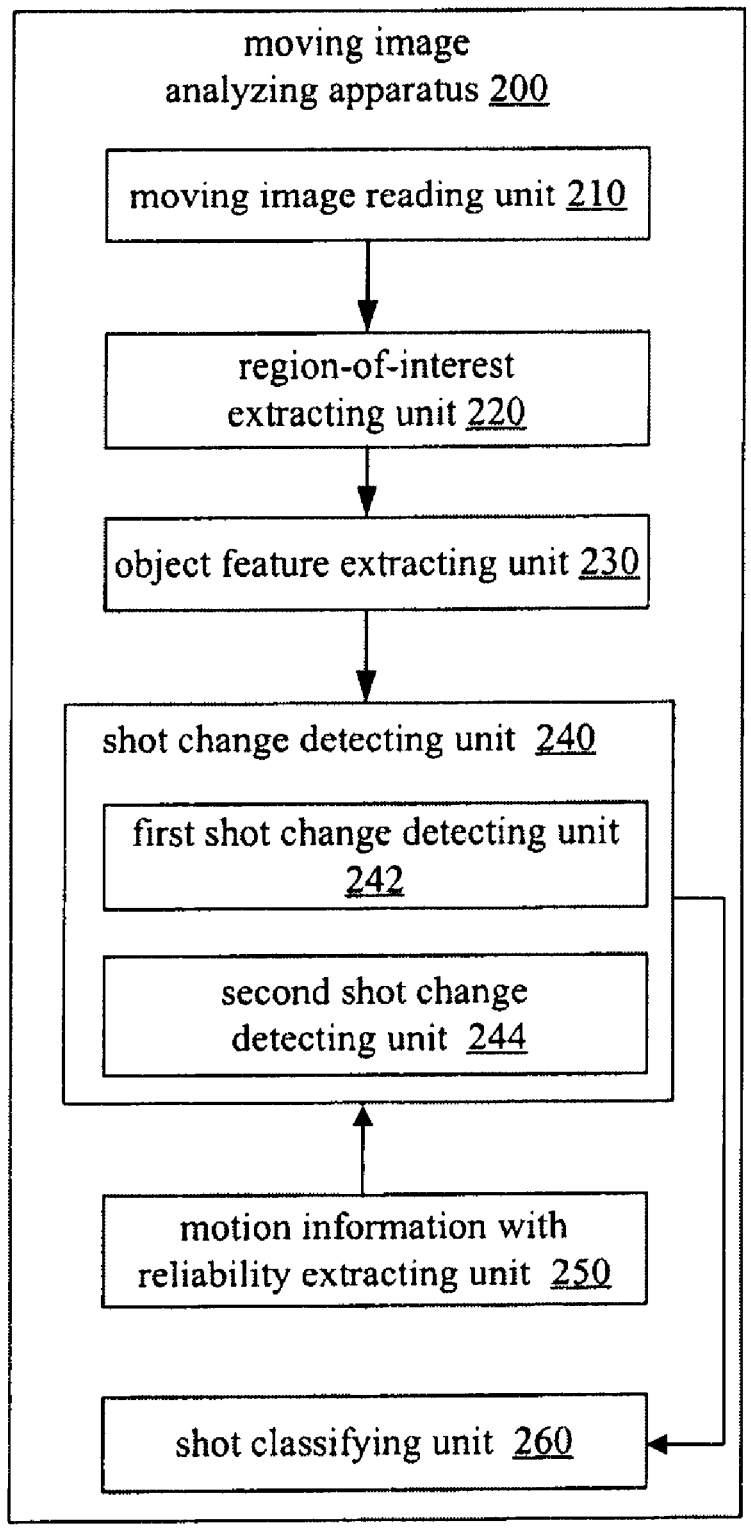
FIG. 2 is a block diagram of the second embodiment of the moving image analyzing apparatus according to the present invention.

FIG. 2 is the block diagram showing the second embodiment of the moving image analyzing apparatus of the present invention. As shown in FIG. 2, the moving image analyzing apparatus 200 comprises a moving image reading unit 210, an region-of-interest extracting unit 220, an object feature extracting unit 230, a shot change detecting unit 240, a motion information with reliability extracting unit 250, and a shot classifying unit 260, wherein the abovementioned moving image reading unit 210, the region-of-interest extracting unit 220 and the object feature extracting unit 230 have the same functions as the moving image reading unit 110, the region-of-interest extracting unit 120, the object feature extracting unit 130 in the first embodiment, respectively, and therefore the description made to them are omitted herein. In addition, the shot change detecting unit 240 comprises a first shot change detecting unit 242 for detecting the shot change on the basis of the differences of the color feature of the moving image and the object feature of the region-of-interest among the images of each frame, and a second shot change detecting unit 244 for detecting the shot change on the basis of the differences of motion information among the images of each frame.

In addition, the moving image analyzing apparatus further comprises the motion information with reliability extracting unit 250. The shot change detecting unit 240 (the second shot change detecting unit 244) performs the detection using the motion information with reliability calculated by the motion information with reliability extracting unit 250.

The first shot change detecting unit 242 and the second shot change detecting unit 244 can sequentially or simultaneously operate. When the first shot change detecting unit 242 and the second shot change detecting unit 244 operate simultaneously, the shot change detecting unit 240 detects the shot change on the basis of the differences of the image color feature, the object feature of region-of-interest and motion information among the images of each frame, detects frame images with similar color feature, the object feature of the region-of-interest, and motion information among the images of each frame as belonging to one shot, on the contrary, detects the frame images with great different color feature, great different object feature of the region-of-interest, and motion information among the images of each frame as belonging to different shots.

The shot classifying unit 260 classifies the shots obtained on the basis of the detection result of the shot change detecting unit 240, and determines whether region-of-interest based on the color feature (referring to the greenness of the playfield in a soccer game) is present in the shot. In the case of no region-of-interest included, the shot is classified into out-of-filed, and in the case of the region-of-interest included, the shot is classified into one of the long shot, the medium shot, and the close shot (also called as the indoor shot) by using the object feature of the region-of-interest.

The units in FIG. 2 can be designed separately as hardware, integrated into several units, and operated through software processing based on the control program.

Figure 3:
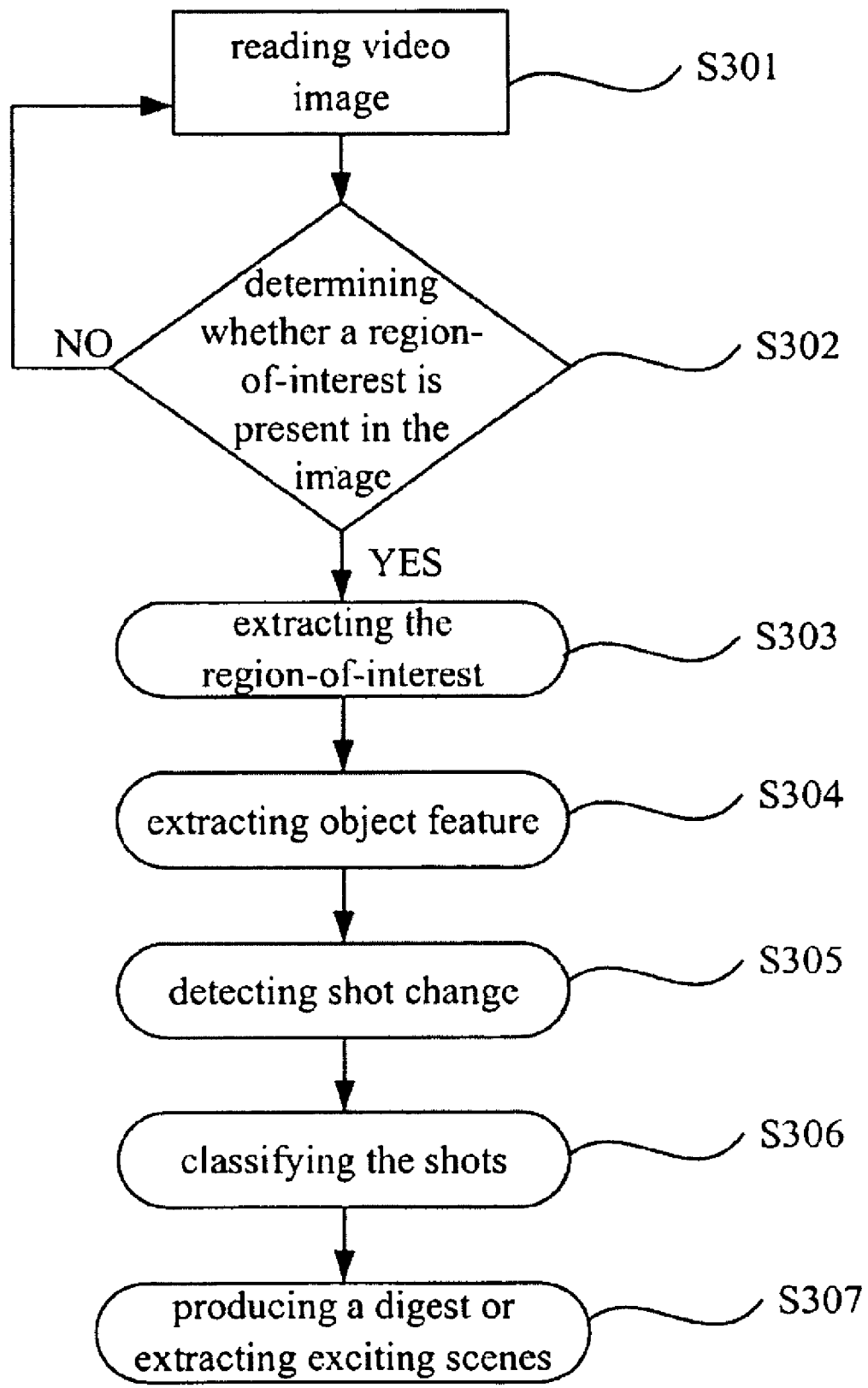
FIG. 3 is a flowchart of an embodiment of the moving image analyzing method according to the present invention.

FIG. 3 is a flowchart of one embodiment of the moving image analyzing method of the present invention. As shown in FIG. 3, firstly, it is reading the video images of a soccer game and the like, wherein the video images may be moving images, news images, or film/TV images (step S301), and extracting the region-of-interest from each frame of the moving images, for example, in the soccer game, determining whether the images include the playfield by using the image feature model of playfield-of-interest (HSV histogram in which HSV refers to the color model) obtained through pre-training (step S302). In the case of playfield included, the region-of-interest is extracted. In the case of no playfield included, the process returns to S301. Afterward, inside the playfield or the region adjacent thereto, the object feature is extracted (step S304). Then, a shot change is detected on the basis of the differences of the color feature of the moving image, the object feature of the region-of-interest, and motion information among the images of each frame (S305). For example, at the time of a soccer game, it is determined whether the shot includes the playfield based on greenness by using the extracted image feature in each shot. In the case of no playfield included, the shot is classified into the out-of-field shot, and in the case of the playfield included, it is classified into one of the long shot, the medium shot and the close shot (step S306). Sequentially, on the basis of the detection result obtained in the shot change detection step S305 and the classification result obtained in the shot classification step S306, a digest is produced or exciting scenes are extracted (step S307).

Figure 4:
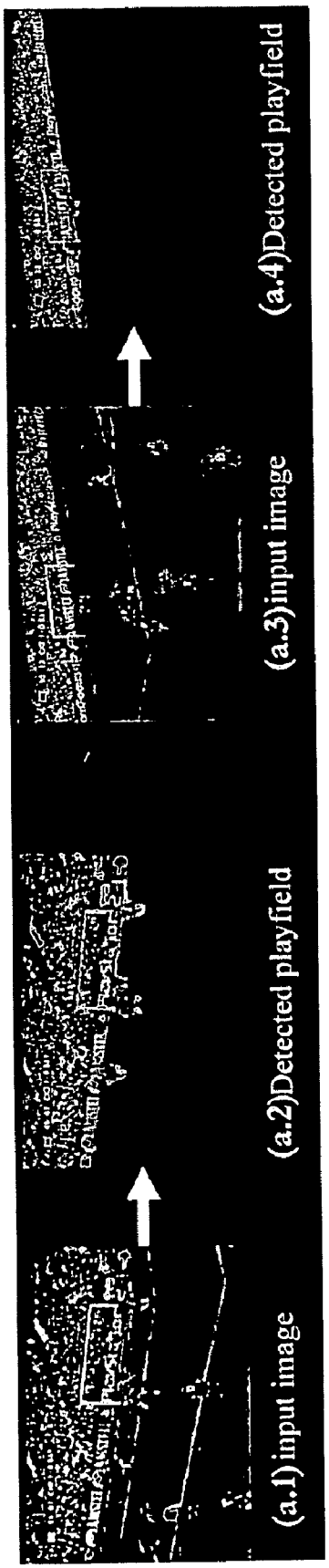
FIG. 4(a) is a detection example of the playfield in a soccer game video.
FIG. 4(b) is the example of the image feature and object feature inside the playfield and the adjacent regions.
Figure 4:
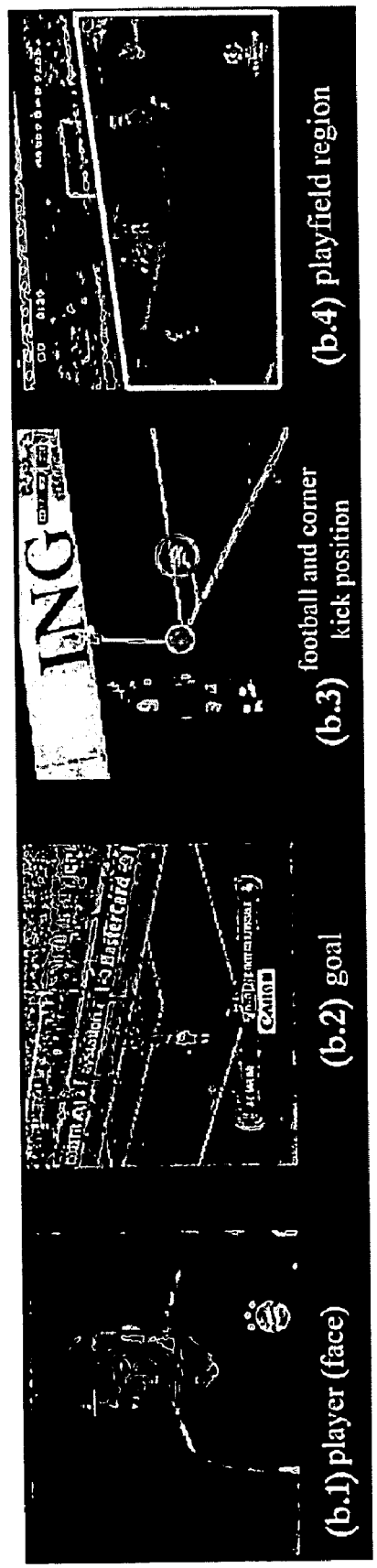

FIG. 4(*a*) is an example of the playfield detection in the soccer game video, and FIG. 4(*b*) is an example of the image and the object features inside the playfield and in the adjacent region. As shown in FIG. 4(*a*), FIGS. 4(*a*.1) and 4(*a*.3) illustrate the input images, and FIGS. 4(*a*.2) and 4(*a*.4) illustrate the detected playfield. In addition, as shown in FIG. 4(*b*), the object feature in FIG. 4(*b*) includes the player in FIG. 4(*b*.1) (particularly the player's face), the goal region in FIG. 4(*b*.2), the football and the corner kick position in FIG. 4(*b*.3), and the playfield region in FIG. 4(*b*.4). Of course, the object feature also includes other features except the above feature, such as the playfield profile and the like.

Figure 5:
Figure 5:
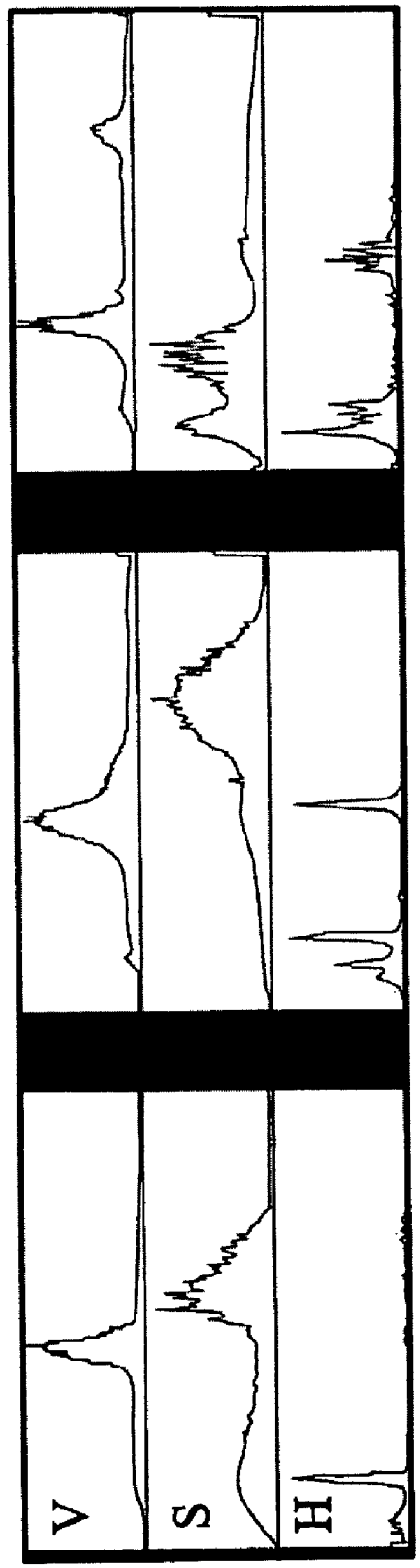

FIGS. 5(*a*) and 5(*b*) illustrate 3D HSV histogram feature used for detecting the playfield in the moving video of a soccer game and the like, wherein FIG. 5(*a*) illustrates the representative image sample of the soccer game, and FIG. 5(*b*) illustrates an diagram illustrating the projection of the image sample 3D HSV histogram on the respective 1Ds. Meanwhile, three images in FIG. 5(*a*) respectively present examples of three sample images which are the long shot, the medium shot and the close shot.

Figure 6:
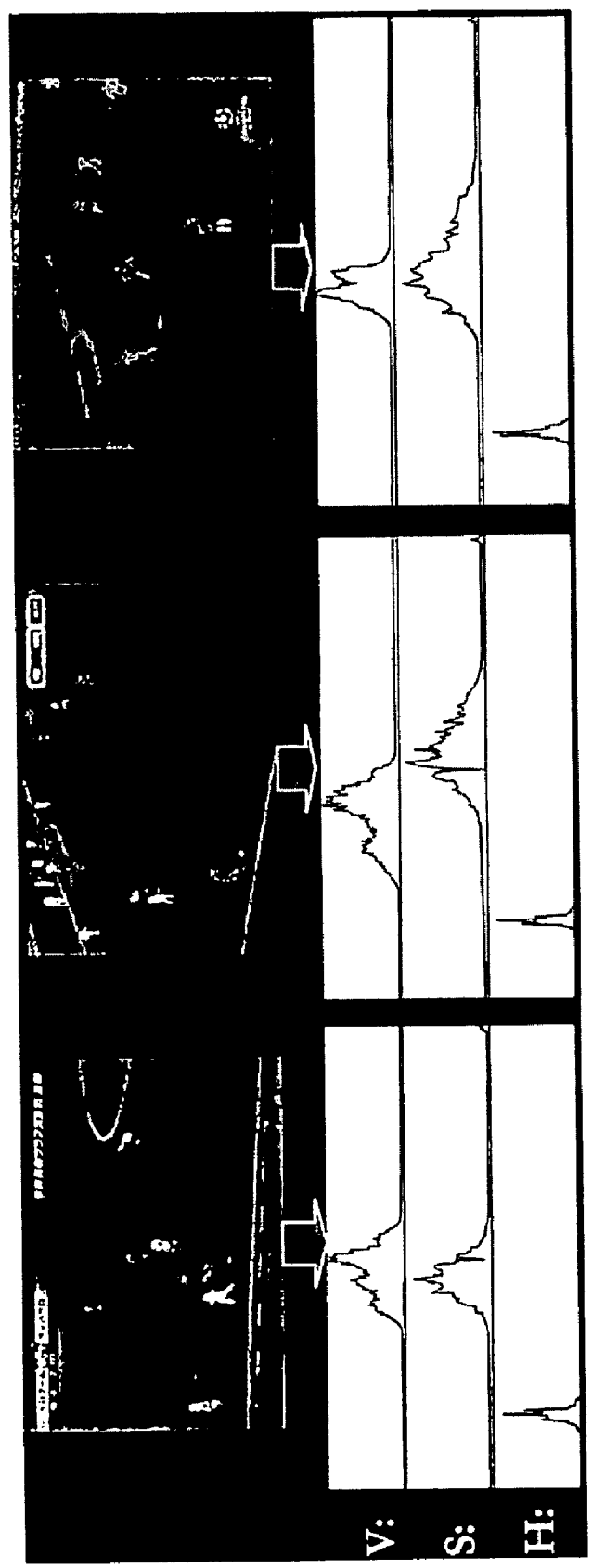
FIG. 6 illustrates the collected image samples depending on different soccer games.

FIG. 6 illustrates the result of statistic data obtained by the statistic processing according to the analysis on the 3D HSV histogram of the image sample (e.g. the images at various time such as daytime, evening, night and so on and the images in various climates such as sunny, cloudy, rain and so on).

For example, the changeable ranges of HSV in the playfield region-of-interest are H[22, 68], S[32, 255] and V[64, 175] respectively and also have the maximum region extents are H: 16, S: 128, V: 64, respectively. That is, it is confirmed that the average value of HSV in the playfield region is changed with respect to hour, climate and other factors of the game, however, the distribution thereof is limited substantially as below H: 16, S: 128, and V: 64. With such HSV features, it is possible to reliably detect the playfield with such HSV feature.

Figure 7A:
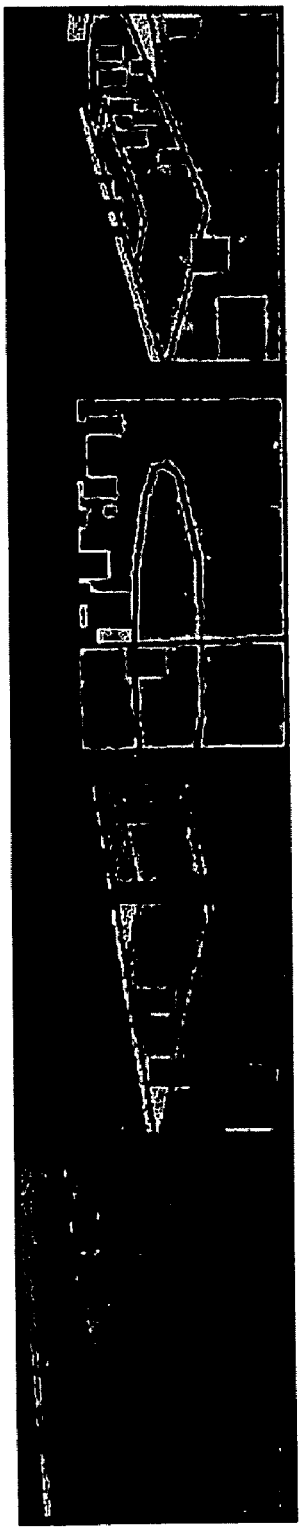
FIG. 7(a) illustrates the examples of images for training used in practice for establishing a statistic model for the 3D HSV histogram.
Figure 7B:
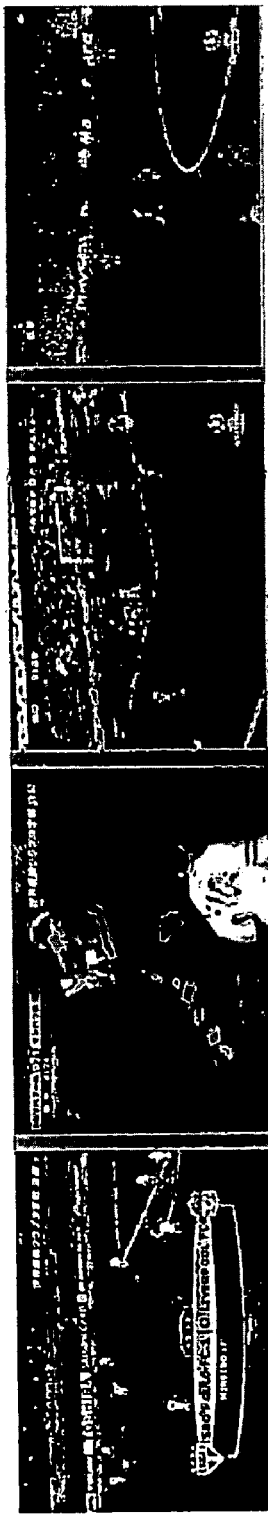
FIG. 7(b) illustrates the detection results of the playfield.

FIG. 7(*a*) illustrates the examples of images for training used with different dominant colors from each other (for example, the greenness of soccer game grassland) in order to obtain a 3D HSV histogram statistic model, and FIG. 7(*b*) illustrates the detection result of the playfield. It is know from the result, various training sample images with different color features are used in the learning of HSV model, therefore, it is possible to correctly detect the playfield under all kinds of lighting conditions.

Figure 8:
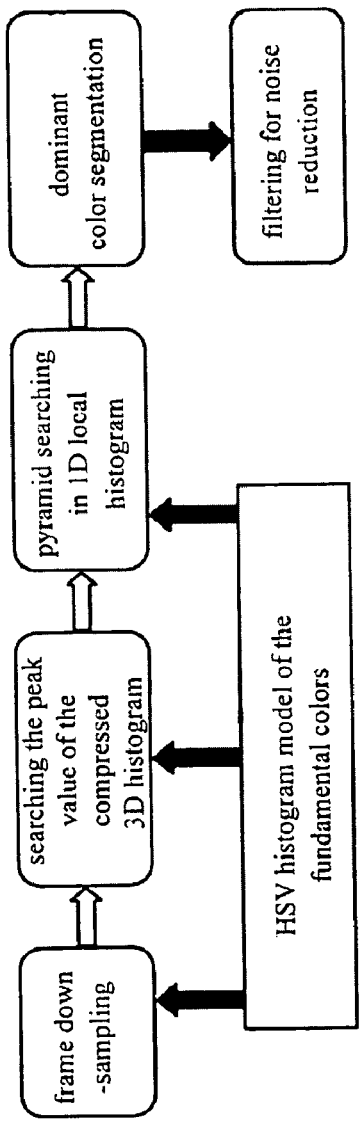
Figure 8:
Figure 8:

FIGS. 8(*a*) to 8(*c*) illustrate the detection results of the playfield-of-interest using the above HSV histogram model. FIG. 8(*a*) shows the detection method of the playfield-of-interest through the above HSV histogram model. As shown in FIG. 8(*a*), the detection method comprises the steps of: frame down-sampling, searching the peak value of the compressed 3D histogram, pyramid searching in 1D local histogram, dominant color segmentation, and filtering for noise reduction. In order to increase the speed of processing and eliminate the noise in the image, the resolution of the input image is decreased. In addition, to alleviate the impact caused by change of illuminate and improving the reliability of the detection process, the resolution of respective components of HSV is compressed from 8 bit to 2-3 bit. Afterwards, the peak values of the respective HSV components are measured and then used as the central values (average value) of HSV. Using the distribution value of HSV above, it is possible to reliably detect the playfield-of-interest. FIG. 8(*b*) illustrates the image sample, and FIG. 8(*c*) illustrates the detection result of the dominant color region. FIGS. 8(*b*) and 8(*c*) illustrate the example of the playfield under different lighting conditions which are detected through such method. It is seen from the results shown in FIGS. 8(*b*) and 8(*c*), it is possible to detect the playfield-of-interest under various lighting conditions timely and reliably.

Figure 9:
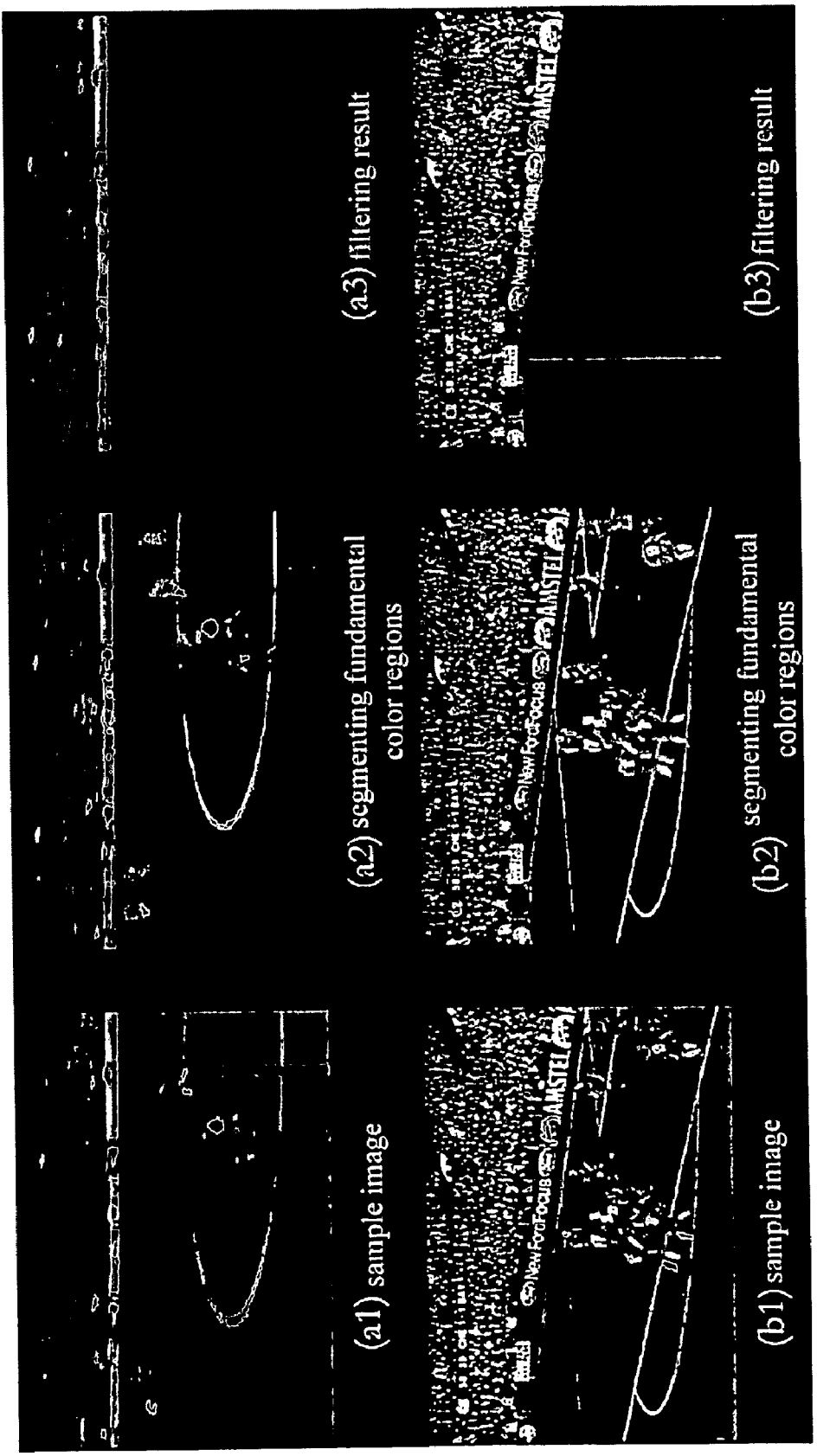
FIG. 9 illustrates the experimental results of the filtering for noise reduction.

In addition, in order to delete the straight lines and the like in the playfield, a post-treatment (filtering process for reducing noise) is also possible. FIG. 9 illustrates the test results, wherein FIGS. 9(a1) and 9(b1) illustrate the sample image, FIGS. 9(a2) and 9(b2) illustrate the segmenting of the dominant color region, and FIGS. 9(a3) and 9(b3) illustrate the filtering of the result, from which it can be found the following inspirations, i.e., the object feature (such as the player, the penalty kick region, the straight line, the corner kick position and the like) inside the playfield and the adjacent region can be extracted by detecting the playfield-of-interest.

Hereinafter, it is described an extracting method of the image/object feature inside the playfield and in the region adjacent thereto.

Figure 10:
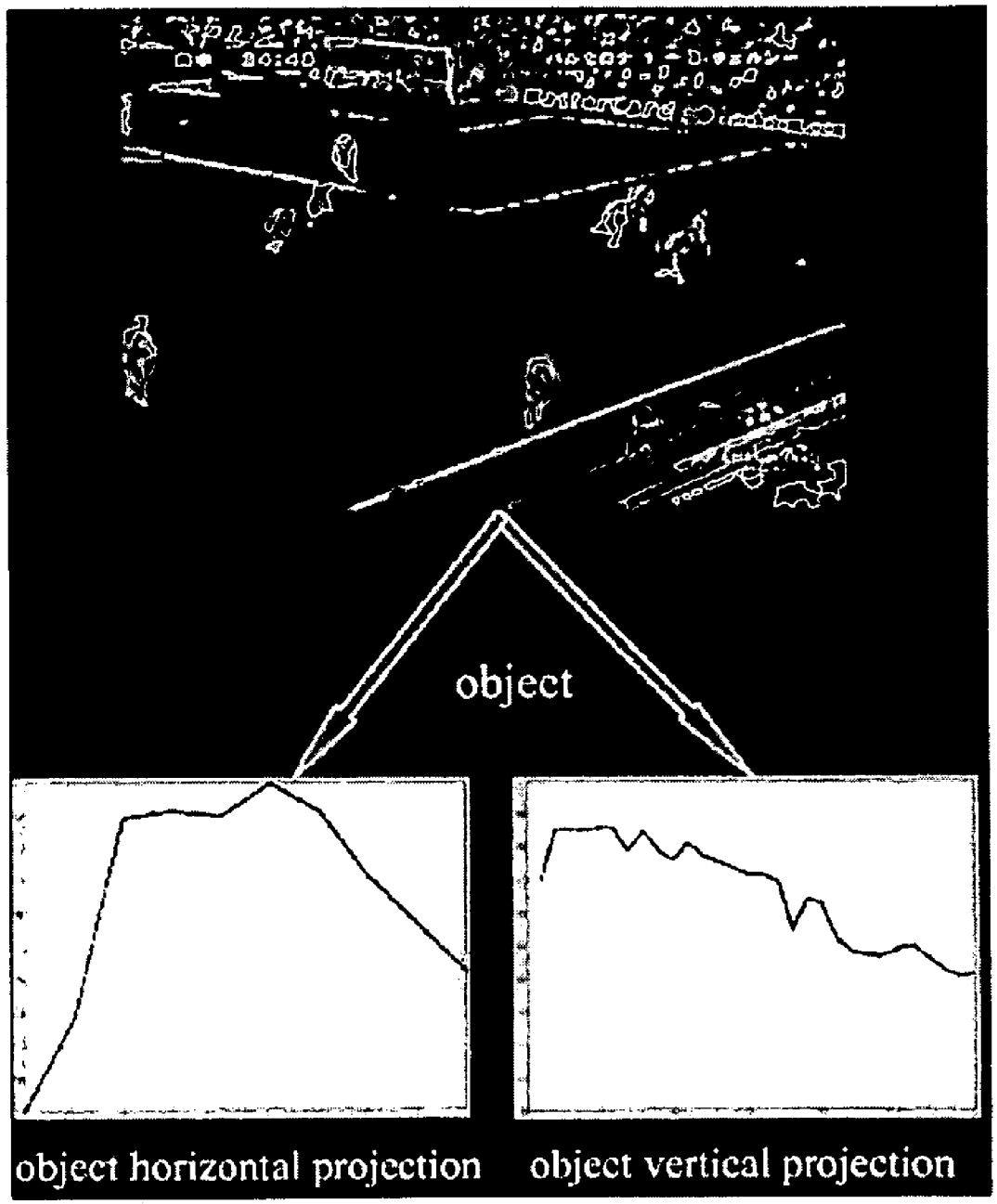
FIG. 10 illustrates the object features in the case that the playfield-of-interest includes the object (player) therein.

FIG. 10 illustrates the object feature in the case that the playfield-of-interest includes the object (player) inside. Herein, the pixel M (i, j) is expressed by equation (1).

$$M(i,j) i \in \{1,2, \ldots, H\}, j \in \{1,2, \ldots, W\} \quad \text{Equation (1)}$$

The object features in the horizontal direction and the vertical direction are expressed by $P_h(i)$ and $P_v(j)$ in equation (2), respectively.

$$P_h(i) = \frac{1}{W} \sum_{j=1}^{W} M(i,j) \quad \text{Equation (2)}$$

$$P_v(j) = \frac{1}{H} \sum_{i=1}^{H} M(i,j)$$

Here, H and W denote the image magnitudes in Y and X directions, respectively.

As for the object feature, when the change in $P_v(j)$ becomes large and the change in $P_h(i)$ becomes small, it means that a large object (person) exists inside the playfield. In addition, when the change in $P_v(j)$ becomes small or the change in $P_h(i)$ becomes large, it means that a small object (person) exists inside the playfield.

Figure 11:
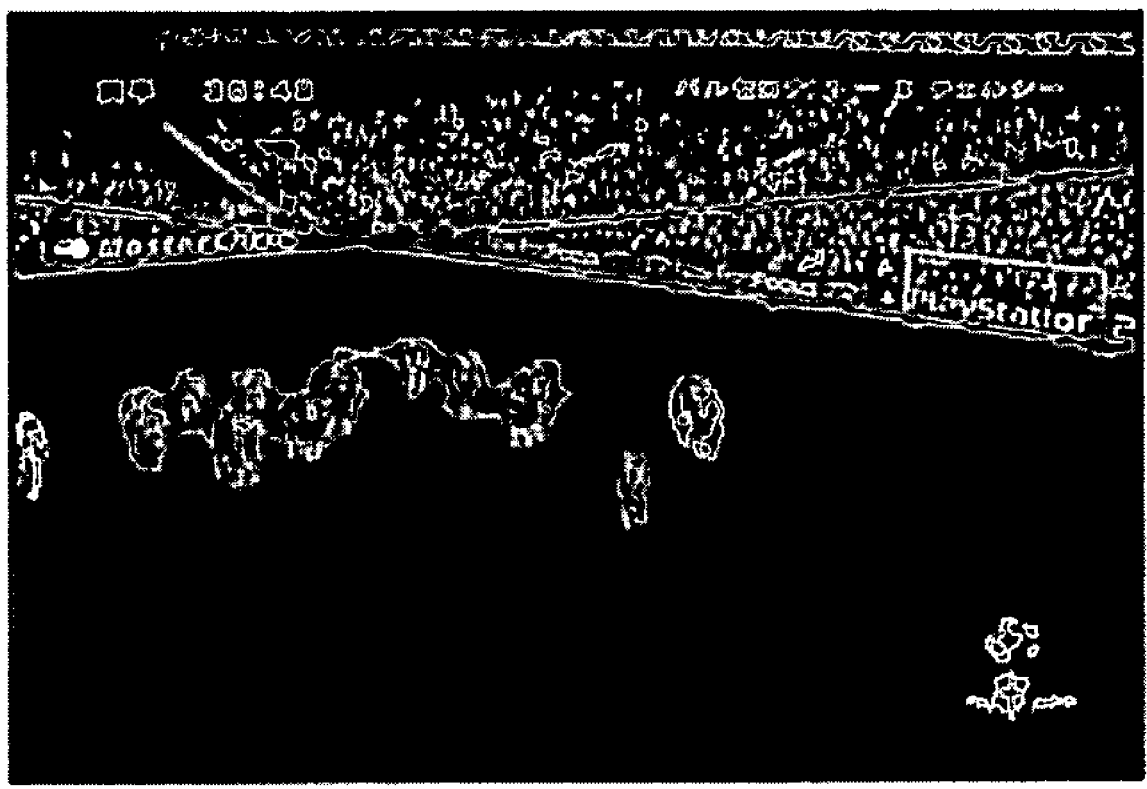
FIG. 11 shows the detection method applicable for the angle between the boundary and the line of the playfield-of-interest and the intersection position.

FIG. 11 illustrates the detection method of the boundary, the angle and the intersection position of the straight lines of the playfield-of-interest. At first, the position B(i) of the boundary is measured. Then, for the purpose of alleviating the impact (such as noise) of the person, the figure and the like close to the boundary, the pixel boundary of the width W is divided into 30 sections along the lateral direction so as to realize low resolution, after which the angle A(i) at the respective pixel position in the low resolution image is calculated. Then, the second class angles of the left and right angles $A_l(n)$ and $A_r(n)$ (n=1, 2, . . . , 30) are calculated in accordance with the following equation (3), and the respective distribution values $D_l(n)$ and $D_r(n)$ are calculated. At this time, the minimum N in the following equation is considered as the intersection of left and right straight lines. Finally, in the case that the angle difference between $A_l(n)$ and $A_r(n)$ at the pixel position N is equal to or more than 10 degrees, the two straight lines were detected, and intersection thereof is detected as the corner kick position (referring to the test results).

$$A_l(n) = \text{median}\{A(1), \ldots, A(n)\} \quad \text{Equation (3)}$$

$$A_r(n) = \text{median}\{A(n+1), \ldots, A(30)\}$$

$$D_l(n) = \left\{ \frac{1}{n} \sum_{i=1}^{n} [A(i) - A_l(n)]^2 \right\}^{1/2}$$

$$D_r(n) = \left\{ \frac{1}{30-n} \sum_{i=n+1}^{30} [A(i) - A_r(n)]^2 \right\}^{1/2}$$

$$N = \text{argmin}_n \{[D_l(n) + D_r(n)] / [A_l(n) - A_r(n)]\}$$

Figure 12:
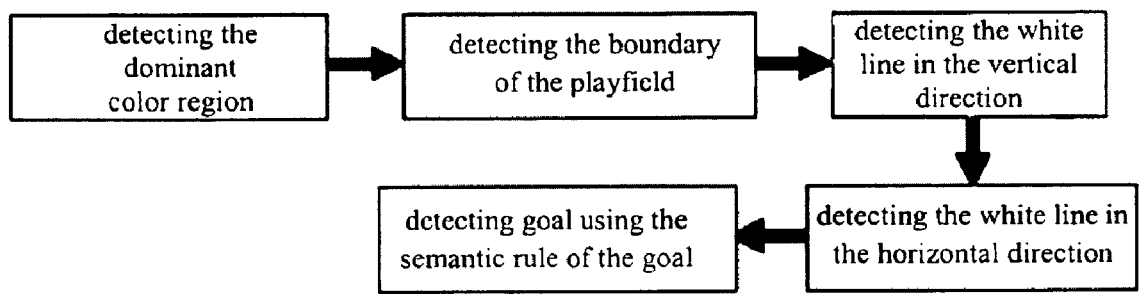
FIG. 12 shows the detection method for the goal.

FIG. 12 illustrates the detection method of a goal which sequentially comprises the steps of: detecting the dominant color region; detecting the boundary of the playfield; detecting the white line along the vertical direction; detecting the white line along the horizontal direction; and detecting the goal using the semantic rule of the goal which is the stipulation of the goal In the rule of the game. As for the playfield-of-interest detected as the above, the white lines along the vertical direction and intersecting with the playfield are detected. Therefore, once two parallel straight lines are detected in the vertical direction, it is confirmed whether a white line along the horizontal direction exists within the region defined (enveloped) by the parallel straight lines. Once two parallel straight lines are detected in the vertical direction and one white line is determined in the horizontal direction, it is processed as a standby of the goal.

Figure 13:
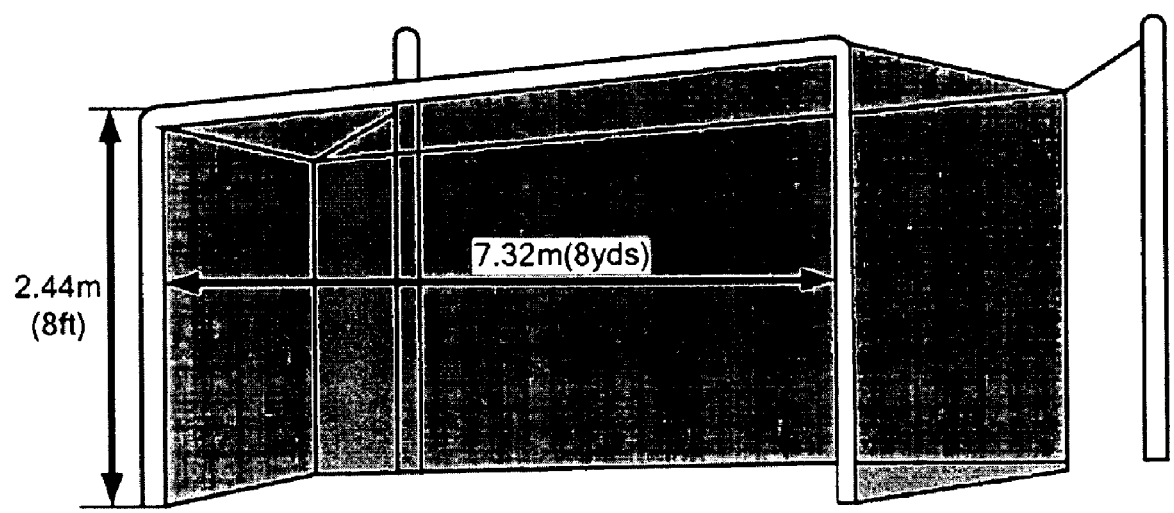
FIG. 13 shows detecting the goal region by the semantic rule of the goal.

FIG. 13 shows the goal region detected using the semantic rule of a goal. As shown in FIG. 13, by using the semantic rule of a goal, that is, the goalpost height and the crossbeam length in the goal region as well as the proportion between the crossbeam length and the playfield width, it is possible to correctly detected the goal region.

Figure 14:
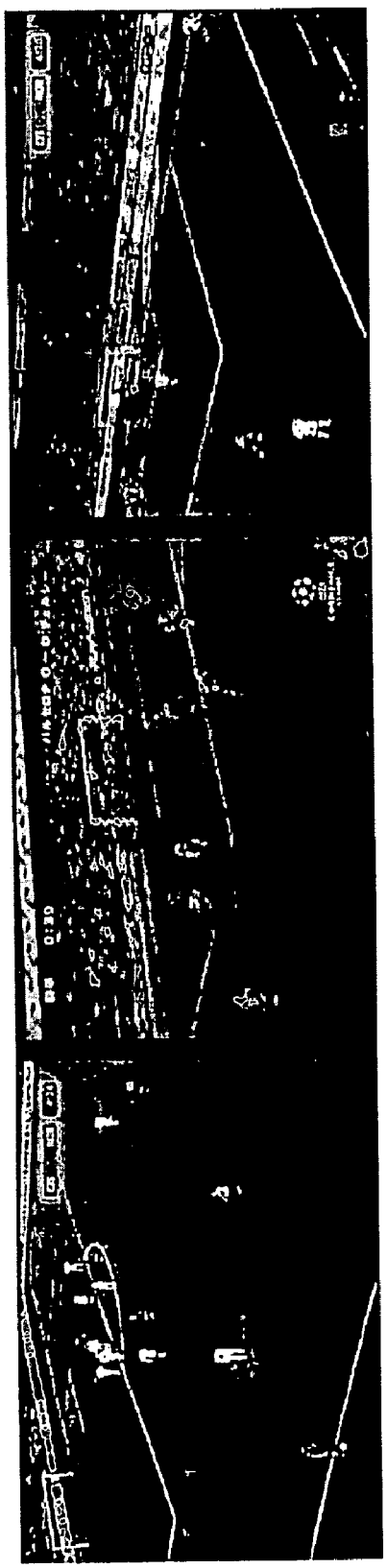
Figure 14:
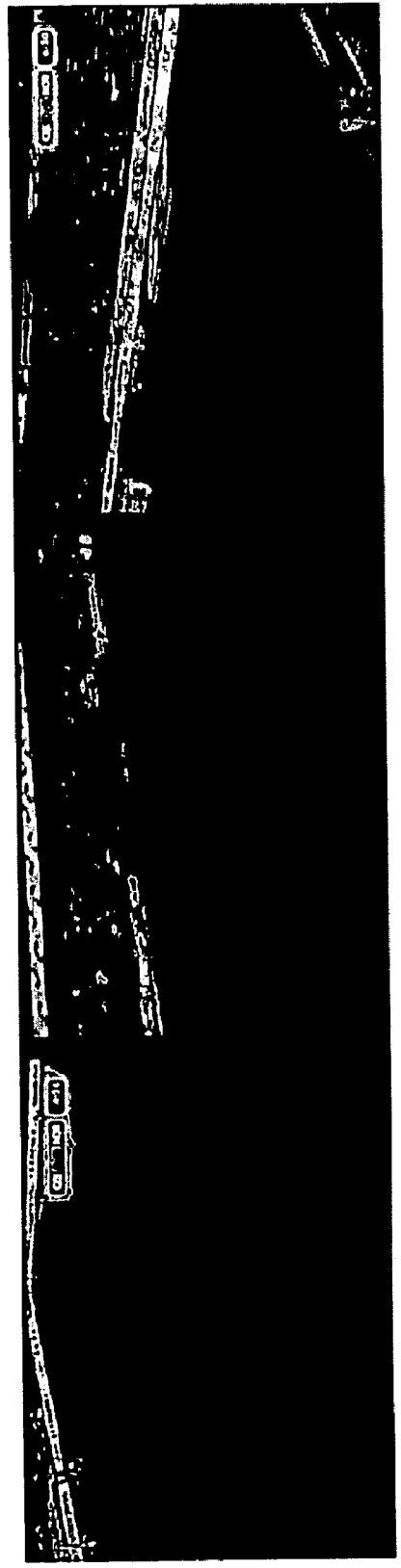

FIGS. 14(a) and 14(b) illustrate the result of the goal detected by the above method. Although the background is complicated, it is capable of detecting the goal region reliably.

Figure 15:
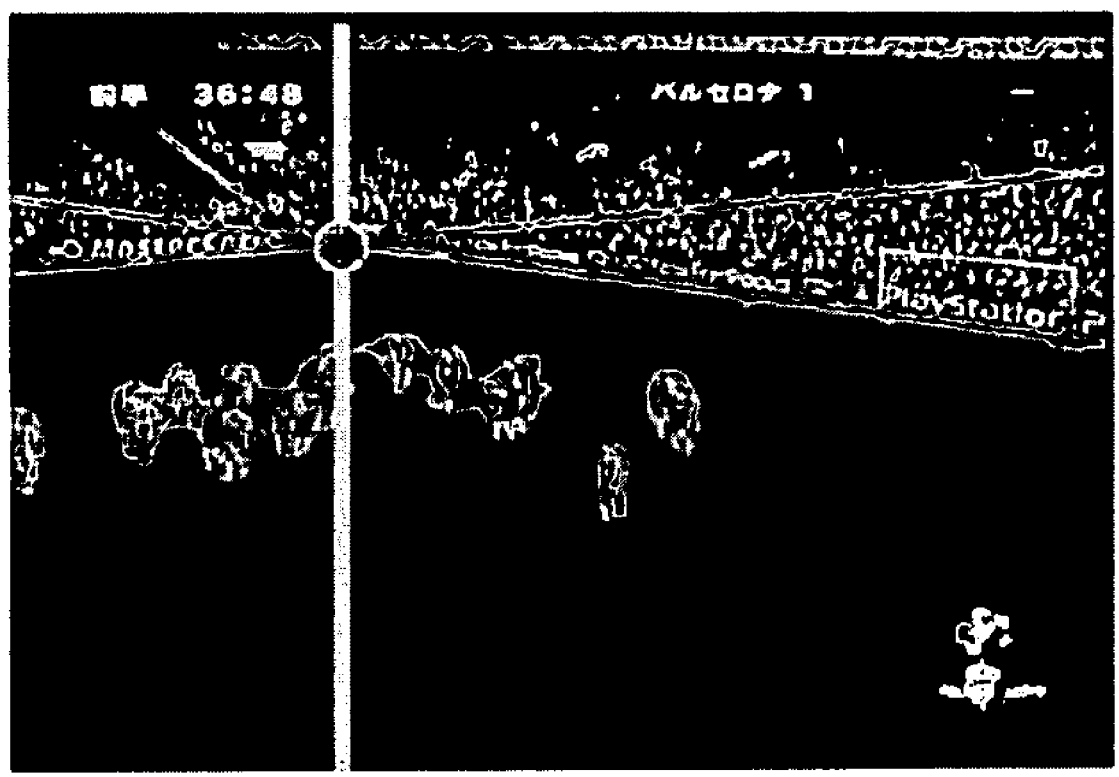
FIG. 15 shows the detection method and the result of the corner kick in the playfield-of-interest.

FIG. 15 illustrates the detection method for the corner kick position in the playfield-of-interest and its result. The detection of the corner kick position uses the same detection method as that of the boundary in FIG. 11.

Figure 16:
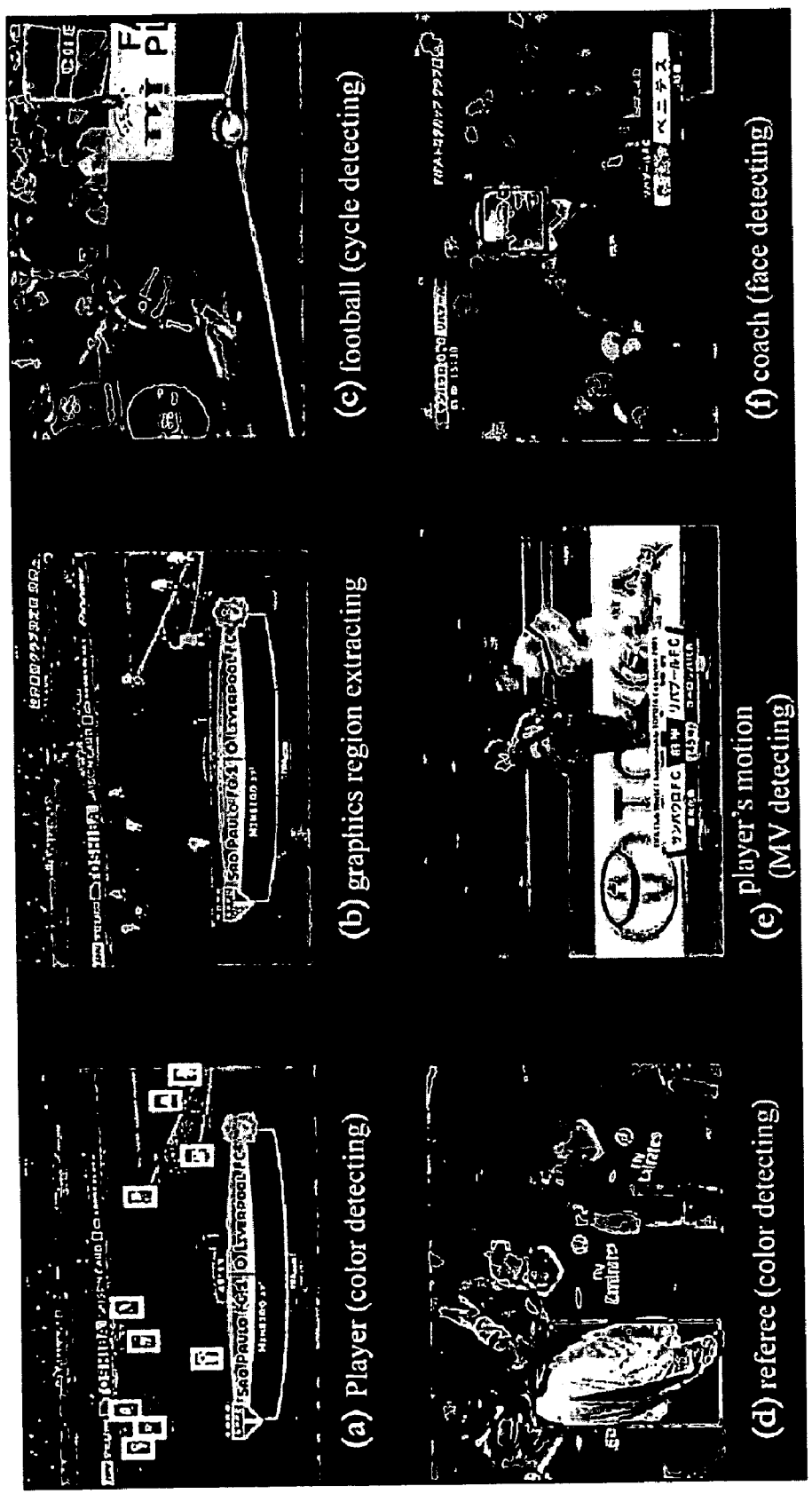
FIG. 16 illustrates the extraction examples of other object features.

FIGS. 16(a) to 16(f) illustrate the extraction examples of other object features. As shown in FIG. 16, FIGS. 16(a), 16(b) and 16(c) illustrate player region, graphics region and ball in the playfield. In addition, FIGS. 16(d), 16(e) and 16(f) illustrate the detection examples of referee (color), motion of the player, coach (face) and the like.

Figure 17:
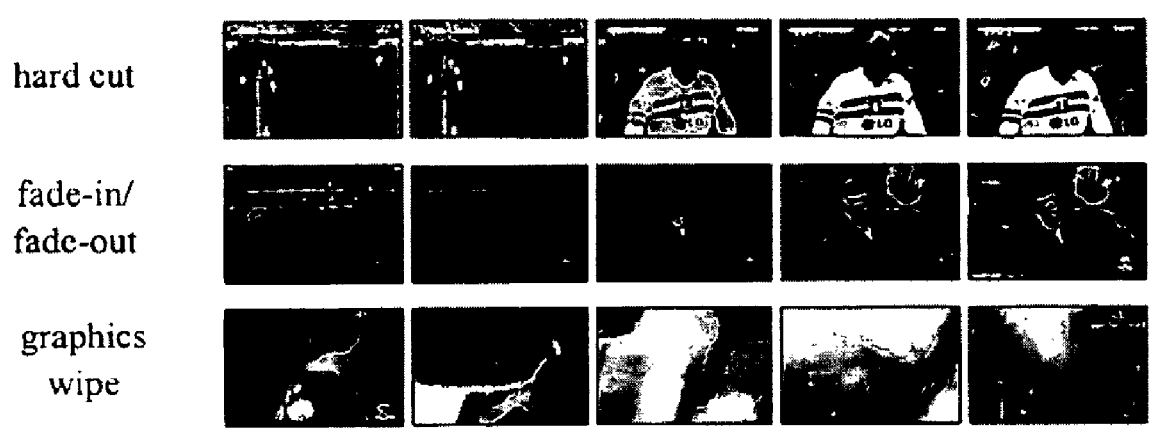
FIG. 17 illustrates the type of shot change.

FIG. 17 illustrates the type of shot change. In general, the shot change includes three types which are the hard cut, the fade-in/fade-out and the graphics wipe. The hard cut is usually changed between several frames (such as one or two frame), and it is therefore easy to detect the change thereof. And the fade-in/fade-out and the graphics wipe are changed between tens of frames (such as from 10 to 30 frames), and it is therefore hard to correctly detect the change of this shot. For example, in the present embodiment, the hard cut is substantially switched between 1 frame, the fade-in/fade-out is substantially switched between more than 15 frames, and the graphics wipe is switched every 30 frames approximately.

Figure 18:
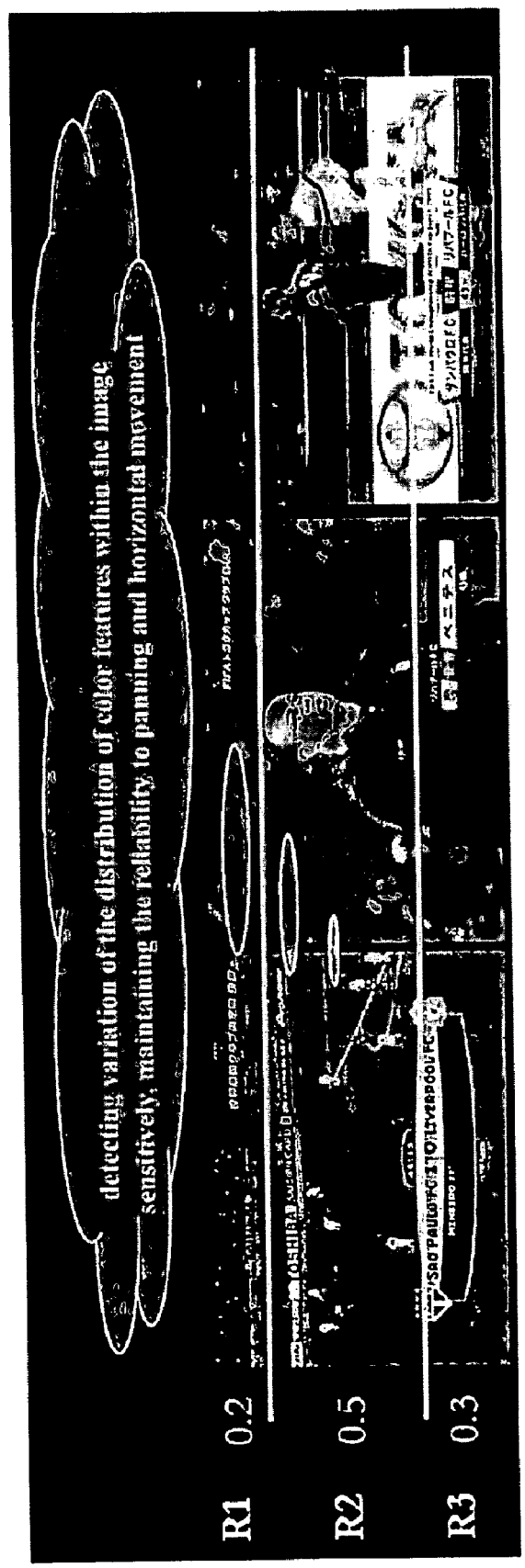
FIG. 18 illustrates the features used for detecting the shot change in the present invention.

FIG. 18 illustrates the object features used for detecting the shot change in the present invention. In order to correctly detect the shot change, it is necessary that (1) maintaining the reliability of the video camera movement and the horizontal movement of the player within the image and (2) sensitively detecting the distribution variation of the color feature within the image.

As a result, in order to achieve the reliability of the image feature variation in the horizontal direction according to (1) and to detect the image color feature variation according to (2), firstly, as shown in FIG. 18, the difference in each frame can be more accurately and effectively detected by dividing the region into several parts. For example, in this embodiment, the division is performed in the proportion of 2:5:3. Then, the above 3D HSV distribution is calculated as the color distribution feature for the respective regions. In this embodiment, the color distribution feature is adapted, and obviously the color RGB feature, the color absolute value and the like are also possible. Additionally, for increasing the reliability of the noise and so on in the image, it is supposed that the respective components of HSV are denoted by 2 bit and the whole HSV distribution feature is denoted by 6 bit of the color feature. Then, the feature expressed by the following equation (4) is used as one feature denoting the difference between the frames.

$$\sum_{i=0}^{63} |H_t(i) - H_{t-\Delta}(i)|/2 \sum_{i=0}^{63} H_t(i) \qquad \text{Equation (4)}$$

Here, Ht(i) is 6 bit of the HSV color distribution feature and $\Delta$ is a constant indicating whether the difference from the object feature which is before a few frames is calculated. In the case that the calculation result of the equation is greater than the predetermined threshold value T1, it is detected as different shots, wherein the threshold T1 is statistically calculated from the moving images.

In addition, in the moving images of a soccer game and the like, the shot change can be more reliably detected by using the feature of the region-of-interest. Herein, it is supposed to use the interested color feature in the above R2 region (i.e., the region located in the picture central portion in FIG. 18) simultaneously. At first, it is confirmed whether the R2 region includes an interested color region therein. When the proportion of the interested color region accounts for up to more than 50%, the second feature of the shot change detection is used. At this time, the difference of the interested color region in the R2 region between time t and (t-$\Delta$) is calculated by the following equation (5). When the difference is greater than the predetermined threshold value T2, it is detected as different shots. Similarly, the threshold value T2 is statistically calculated from the images of the moving game.

$$|R2_t - R2_{t-\Delta}|/R2_t \qquad \text{Equation (5)}$$

Figure 19:
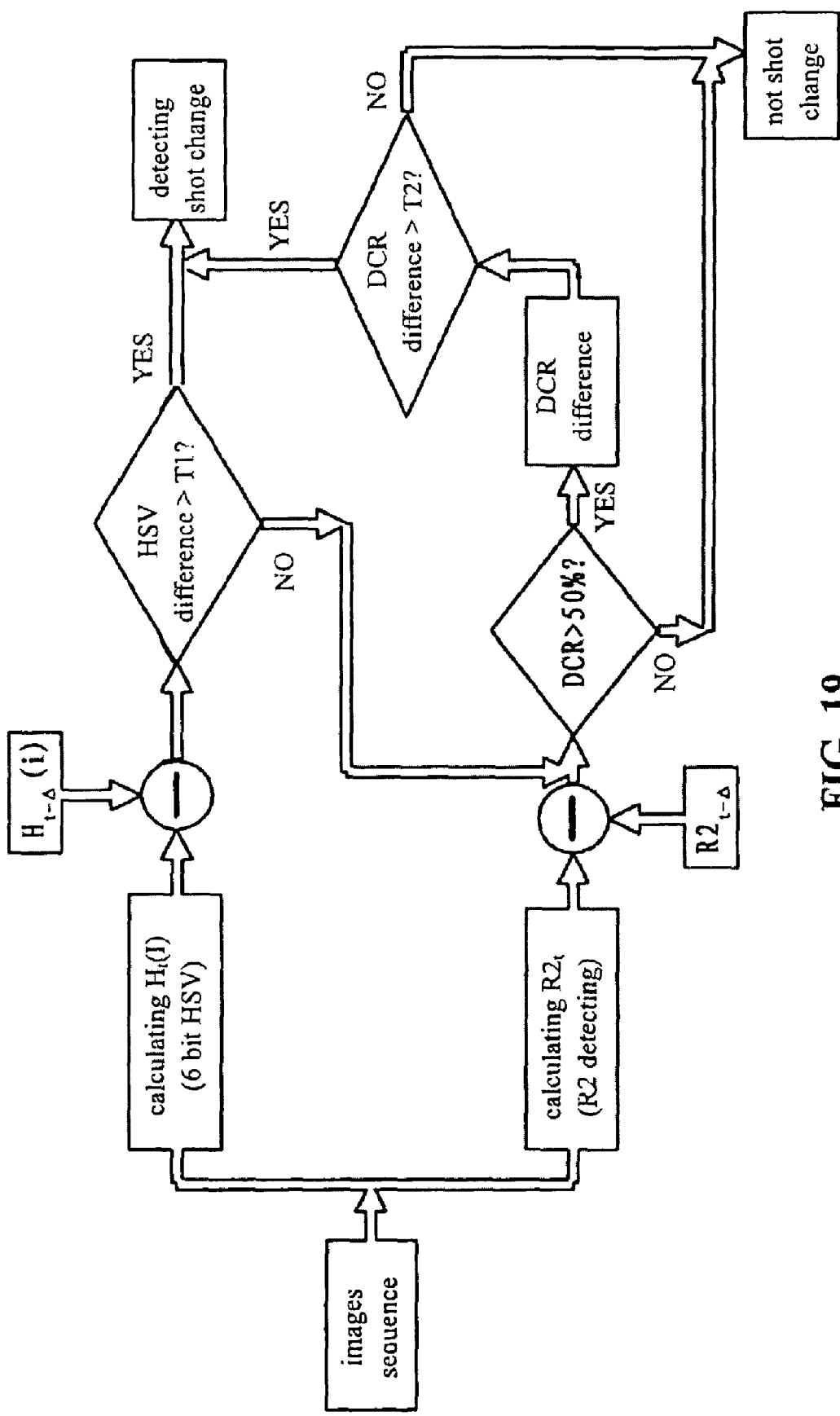
FIG. 19 illustrates a flowchart of the detection algorithm for a shot change.

FIG. 19 is an flowchart of the shot change detection algorithm. As described above, the current HSV distribution $H_t(i)$ denoted by 6 bit is calculated and the difference with the HSV distribution $H_{t-\Delta}$ (i) at the time (t-$\Delta$) is calculated. When the difference is greater than the threshold value T1, it is detected as shot change. Otherwise, the interested color region in the R2 region (it is green playfield in the case of a soccer game) is detected. When the size of the interested color region accounts for more than 50% of the R2 region, the difference of the region size between the current time t and the time (t-$\Delta$) is calculated. In the case that the difference is greater than the threshold value T2, it is detected as shot change.

Figure 20:
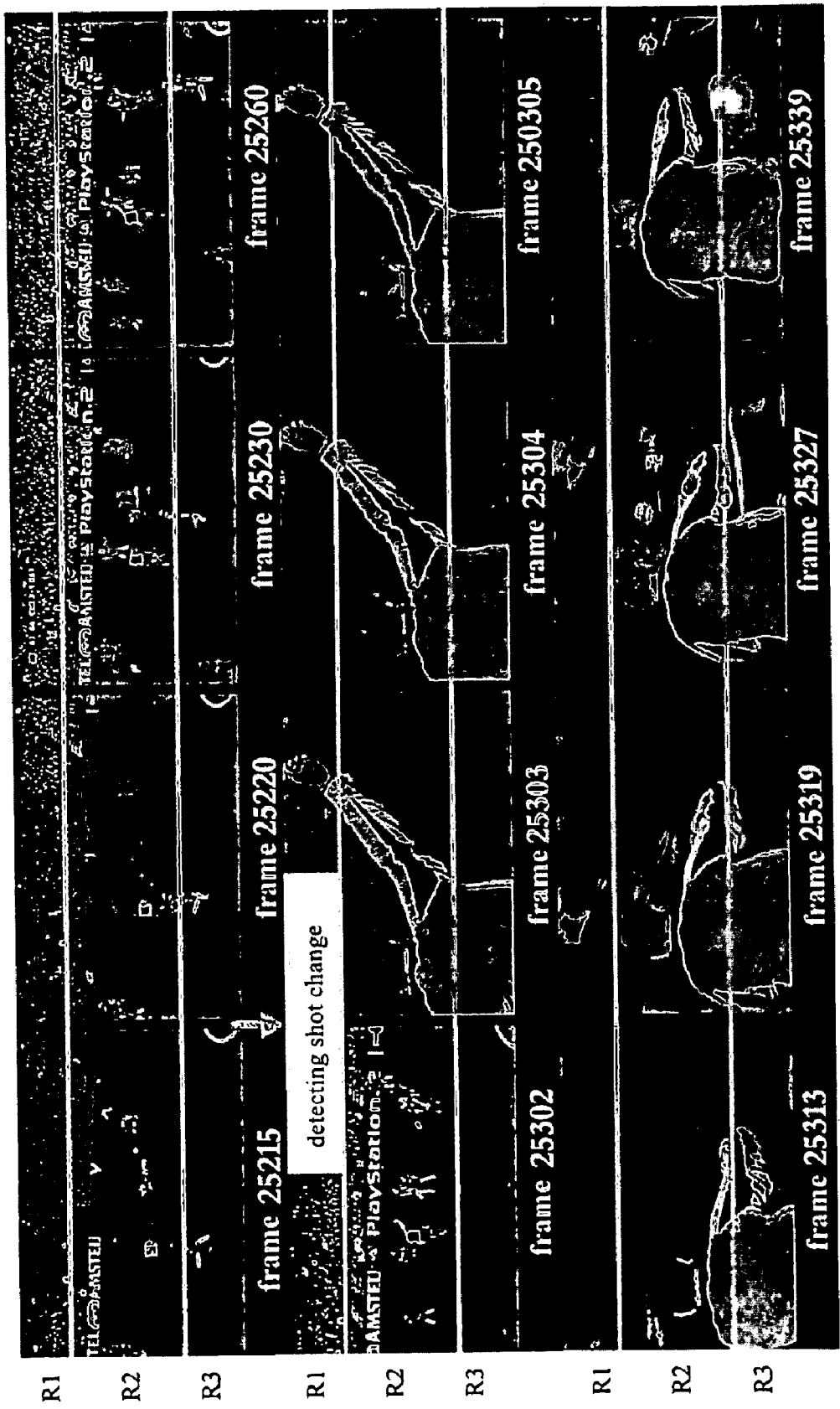
FIG. 20 illustrates an embodiment of the shot change detection.

FIG. 20 illustrates the embodiment of the shot change detection. By estimating the difference of the HSV distribution between the individual regions R1, R2 and R3 as well as the difference of the interested color (green region) in the R2 region, it is possible to detect shot changes. As an example, by training a SVM classifying device for shot change using the above DC feature, RH feature and MV feature, the trained SVM classifying device is used for detecting the shot changes.

Figure 21:
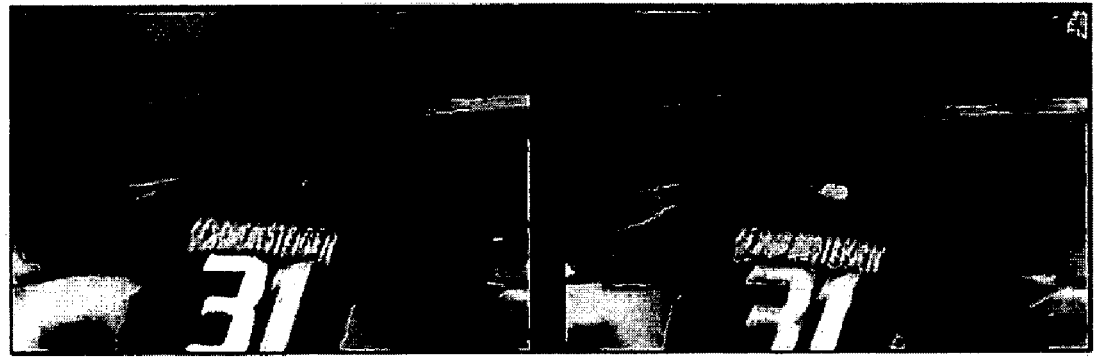
FIG. 21(a) shows that in the case that the video camera is moving at a high speed, the change in the background region which is essentially in the same shot is incorrectly detected as a shot change.
FIG. 21(b) shows that in the case that the changes of the color feature and the region-of-interest (grassiness playfield) between two adjacent frames are not significant when a shot change occurs, the shot change is not detected.
Figure 21:
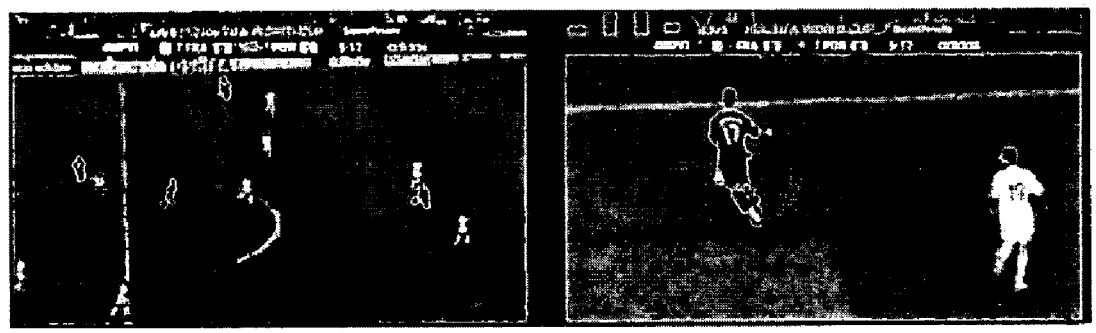

As shown in FIG. 21(a), in the case that the video camera is moving at a high speed, since the change in color feature is relatively significant between two adjacent frames due to the variation in background region, the contents which should be in the same shot are often detected as a shot change, resulting in an "incorrect detection". That is, the shot change is performed unnecessarily.

In contrast, in the scene of shot change as shown in FIG. 21(b), the color feature change between the two adjacent frames and the change in region-of-interest (green playfield) are not significant, and the "detection error" where a shot change is detected as a single shot occurs frequently. That is, a shot change is not performed when it is necessary.

Figure 22:
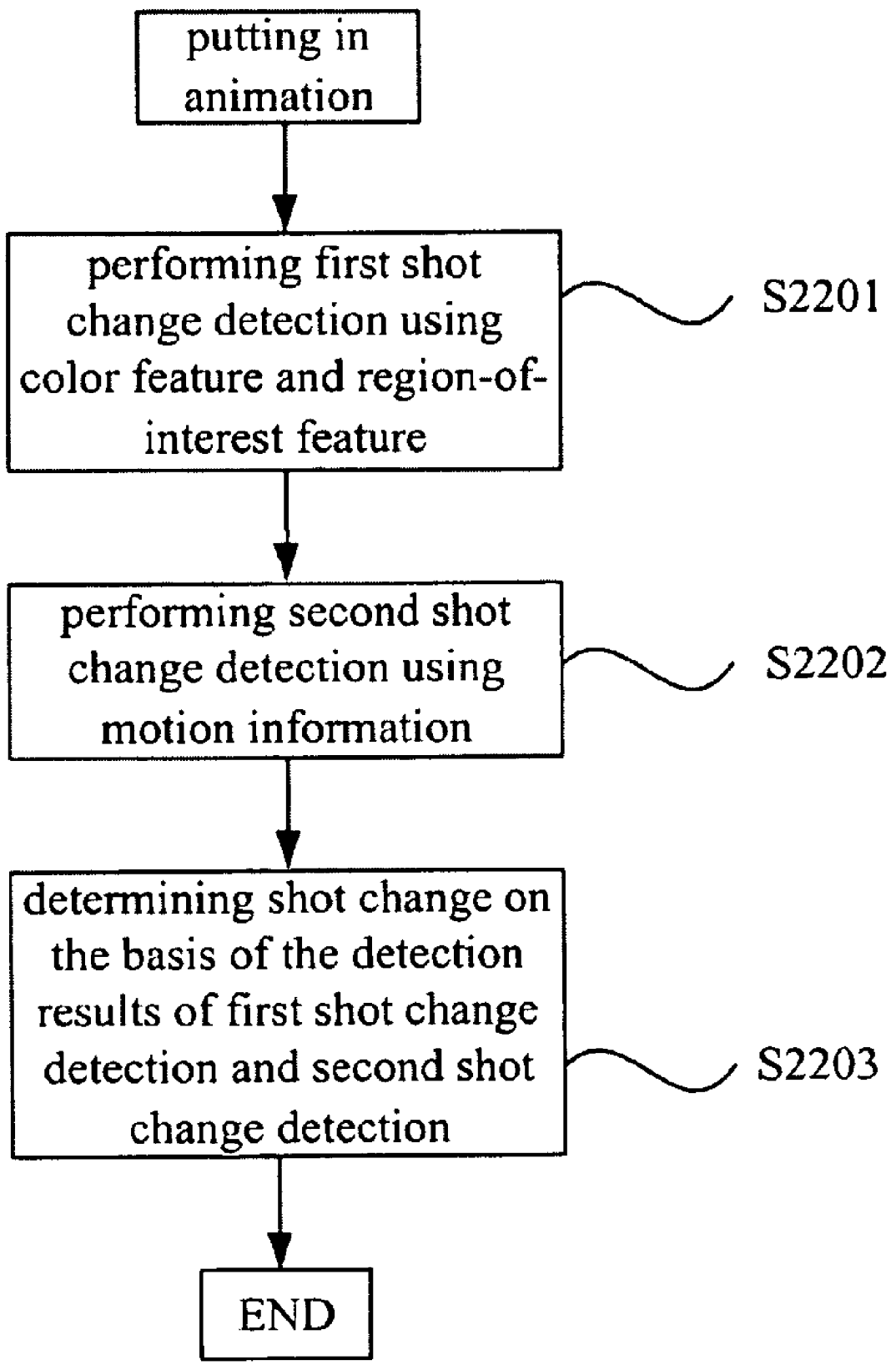
FIG. 22 illustrates a flowchart of the example of the shot change detection (i.e. the example when it is determined uniformly).

Consequently, in order to alleviate the above "incorrect detection" and the "detection error", it is proposed a shot detection method using motion information. FIG. 22 illustrates the detailed steps of said method.

FIG. 22 shows an example (one of the unified confirmation) of the shot change detection. At first, in the above method using the color feature and the region-of-interest feature, the first shot change detection using the color feature and the region-of-interest feature is performed (S2201); then the second shot change detection using the motion information is performed (S2202); and then the shot change is detected on the basis of the detection results of the first shot change detection and the second shot change detection (S2203). Table 1 is an illustration of the determination in step S2203 in FIG. 22.

TABLE 1

| S2201 | S2202 | S2203 |
|---|---|---|
| With shot change | With shot change | confirming the detection result detected as different shot change in S2201 |
| With Shot change | Without shot change | incorporating the content detected as different shot change in S2201 as the same shot change |
| Without shot change | With shot change | dividing the content detected as the same shot change in S2201 as different shot changes |
| Without shot change | Without shot change | confirming the detection result detected as the same shot change in S2201 |

During the above shot change detection using the color feature and the region-of-interest feature, it is possible to confirm the incorrect detection after the shot change detection as shown in FIG. 22 is completed, or during the detection of the shots every time, or in the case of detecting the shot changes every time. The detailed steps for individually handling each shot are as follows:

Step B1: performing the first shot change detection using the color feature and the region-of-interest feature on shot k;

Step B2: determining whether the detection result of Step B1 and the former shot (k-1) are the unified (single) shot change (i.e., whether there is a shot change between shot (k-1) and shot k);

If the result of the determination of the above step B2 is "yes", it goes to step B3-1, i.e., it is confirmed whether a shot change does not presents between shot k-1 and shot k by the second shot change detection using the motion information, and otherwise, it goes to step B3-2, i.e., it is confirmed whether a shot change does exist between shot (k-1) and shot k by the second shot change detection using the motion information.

After finishing step B3-1 or B3-2, it is also determined whether the shot change detection has been performed for all the shots in the input animation. If the result of the determination is "yes", the operation is end, and otherwise, k=k+1 and it returns to step B1.

Hereinafter describes two embodiments of the unified processing model shown in FIG. 22:

EXAMPLE 1

With the detection results of the color feature and the region-of-interest in S2201, if only shot change #1 (consisting of (shot) 1, 2, ..., 6) is detected as long shot, then it goes to S2202, wherein it is confirmed whether a shot change (shot change) does not exist between shots 1-6 by using the motion information.

EXAMPLE 2

With the detection results of the color feature and the region-of-interest in S2201, when three different shot changes that only shot change #1 (consisting of shots 1, 2 and 3) is determined as the long shot, the shot change #2 (consisting of shots 4, 5 and 6) as the medium shot and the shot change #3 (consisting of shots 7, 8 and 9) as the long shot (close shot), it goes to S2202 wherein it is confirmed whether a shot change exists between shot 3 and shot 4 and between shot 6 and shot 7 by using the motion information (equivalent to the above step B3-2). If it is confirmed to be not exist, the current shot and the former adjacent shot are regarded as being the same shot change and the confirmation of whether no shot change exists between shots 1-3, shots 4-6 and shots 7-9 is made (equivalent to step B3-1), and otherwise if it is confirmed to be exist, the division into a plurality of shot changes is performed.

With the process of S2202, the steps for confirming whether a shot change exist can be performed in other sequences.

If a confirmation equivalent to the above step B3-2 is made, the confirmation equivalent to the above B3-2 is not necessary for the shot divided into the plurality of shot changes.

If a confirmation equivalent to the above Step B3-1 is made, the confirmation equivalent to the above Step B3-2 is not necessary to the shot consisted with the current shot and the former adjacent shot which are regarded as the same shot change.

Hereinafter describes embodiments of the model for individually handling each shot:

EXAMPLE 3

With the detection results of the color feature and the region-of-interest in step B1, when two different shot changes that the shot change #1 (consisting of the shots 1, 2 and 3) is detected as the long shot and the shot change #2 (consisting of the shots 4, 5 and 6) as the medium shot, at the point of time (k=2) when the detection on shot 2 next to the shot 1 is finished, it is confirmed whether no shot change exists using the moving feature by step B3-1.

The process of the step B3-1 is performed at the point of time (k=3) when the detection on shot 3 next to the shot 2 is finished.

As shot 4 is determined as different shot changes, step B3-2 is performed at the point of time (k=4) when the detection on shot 4 next to shot 3 is finished, it is confirmed whether the determination of the shot change is correct by using the moving feature.

At the point of time (k=5) when the detection on shot 5 next to shot 4 is finished and at the point of time (k=6) when the detection on shot 6 next to shot 5 is finished, the process of step B3-1 is performed.

When there is no shot switch in step B3-1 (which is same as the detection result of step B1), the shot with the former status and the adjacent one detected as the same shot change is stored.

When there is a shot change in step B3-1 (which is different from the detection result of step B1), the shot change in this shot is detected and divided into a plurality of shots (as a result, the missing of shot change detection caused by the incorrect detection which is brought about by the mixing of the long shot and the medium shot can be alleviate).

When there is a shot change in step B3-2 (which is same as the detection result of step B1), the shot with the former status considered as being different shot change from the shot which is just determined is stored.

When there is no shot change in step B3-1 (which is different from the detection result of Step B1), the shot and the adjacent one detected are in the same shot change (as a result, the incorrect detection of shot change caused by the video camera movement at a high speed and the image blur is alleviated).

Figure 23:
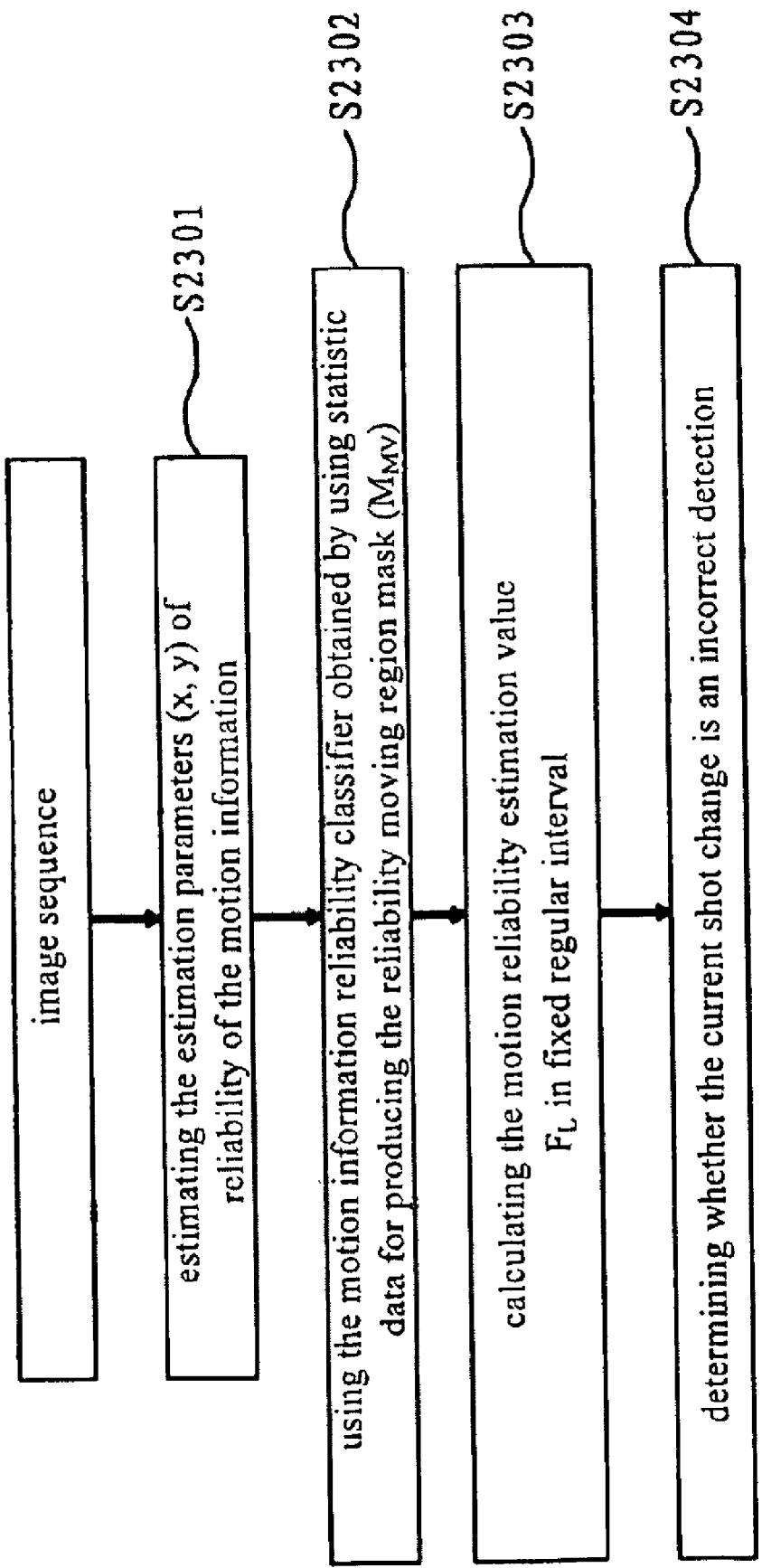
FIG. 23 shows the shot detection method for estimating the reliability using the motion information.

FIG. 23 shows the shot detection method for the reliability estimation using the motion information wherein the reliability estimation is with respect to the incorrect detection of a shot detection method using the above color feature and the region-of-interest feature. At first, "the parameters (x, y) used for reliability estimation" are estimated according to the motion information between two adjacent frames (S2301). Then, the motion information reliability classifier obtained by using statistic data is used for producing the reliability moving region mask ($M_{MV}$) (S2302). Afterwards, the image containing a person is further used as training data and moreover, by using "the motion information weight $W_{MV}$" which is obtained according to the training data and denotes the frequency on which the person within the image moves and by using the above "reliability moving region mask $M_{MV}$", the moving reliability estimation value $F_L$ at fixed regular interval is calculated according to the following equation (6) (S2303). Finally, through the training result of the moving reliability estimation value using the statistic data, it is possible to determine whether the current shot change is an incorrect detection (S2304).

$$F_L(t) = \sum_{i=1}^{N_V}\sum_{j=1}^{N_H}[W_{MV}(i,j,t)\cdot M_{MV}(i,j,t)] \Big/ \sum_{i=1}^{N_V}\sum_{j=1}^{N_H} M_{MV}(i,j,t) \quad \text{Equation (6)}$$

Figure 24:
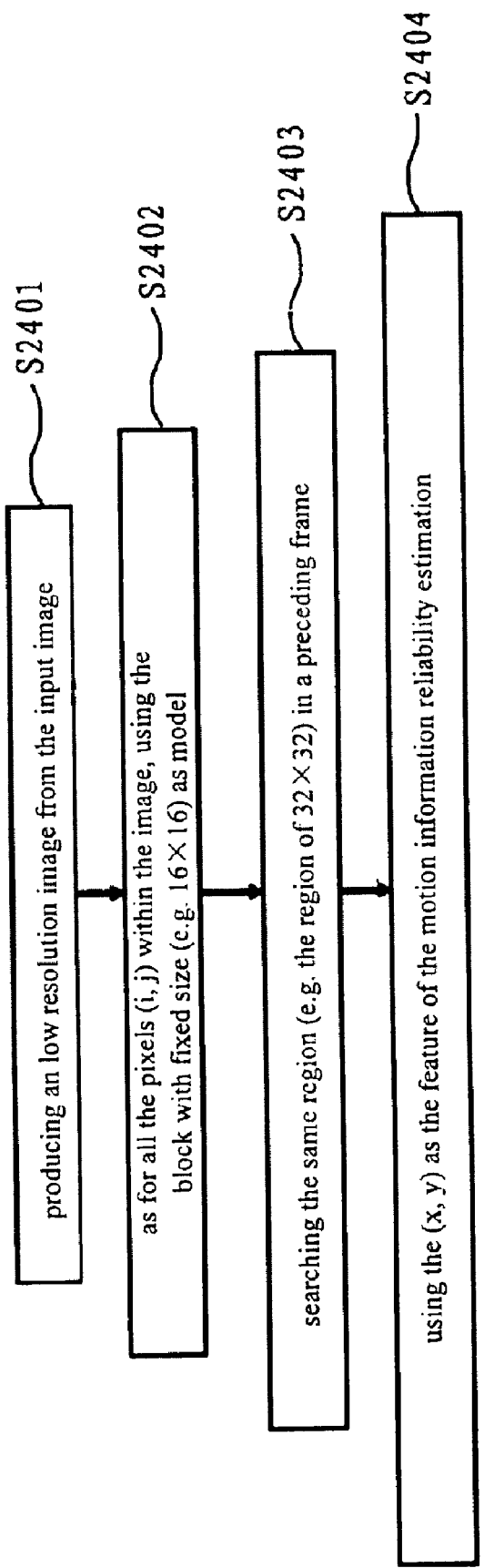
FIG. 24 illustrates a flowchart where the "reliability estimation parameters (x, y)" of the motion information within image are estimated from the motion information between two adjacent frames.

FIG. 24 illustrates a method for estimating the "the parameters (x, y) used for reliability estimation" of the motion information in image according to the motion information between two adjacent frames. If required (e.g. for calculating with high speed), the low resolution image is produced from the input image (S2401). Then, as for all the pixels (i, j) within the image, the block with a fixed size (e.g. 16×16) serves as the model (S2402) and the same region (e.g. the region of 32×32) is searched in a preceding frame (S2403). In addition, SAD estimation value (Dss) is used as the error estimation during the searching, wherein Dss is calculated according to the following equation (7). Using the estimation value (Dss) of the respective pixel position ($X_{MV}, Y_{MV}$) in the searched region, the fitting of the following quadric model is made and the parameters (a, b, c) of the model are calculated. Finally, using $x=(a\times b)^{1/2}$ and $y=c$, the parameters (a, b, c) are converted into (x, y) and the (x, y) are regarded as the feature of the motion information reliability estimation (S2404).

$$D_{ss} = a \cdot X_{MV}^2 + b \cdot Y_{MV}^2 + c \qquad \text{Equation (7)}$$

Figure 25:
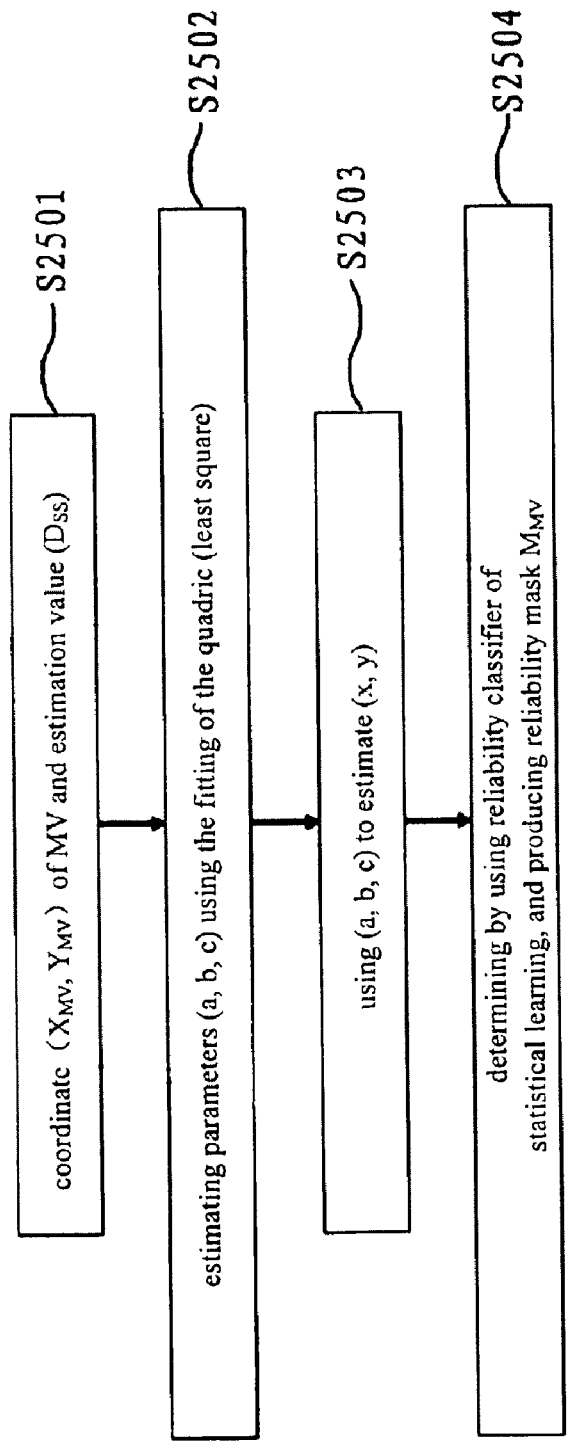
FIG. 25(a) illustrates the features estimated by using the above motion information reliability.
FIG. 25(b) illustrates the example of the completed MMV mask.
Figure 25:
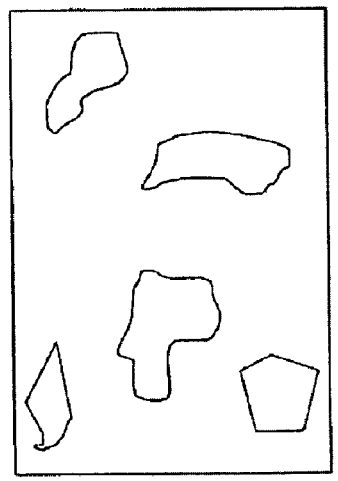

FIG. 25(a) illustrates the process of producing the reliable moving region mask $M_{MV}$ by using the feature (x, y) of the above motion information reliability estimation. Herein, by using the feature (x, y), the value of mask $M_{MV}$ is set as 1 when it is determined as the reliable motion information. In addition, the classifier for determining reliability is obtained by the training using the statistic data. FIG. 25(b) illustrates an example of the completed $M_{MV}$ mask.

Figure 26:
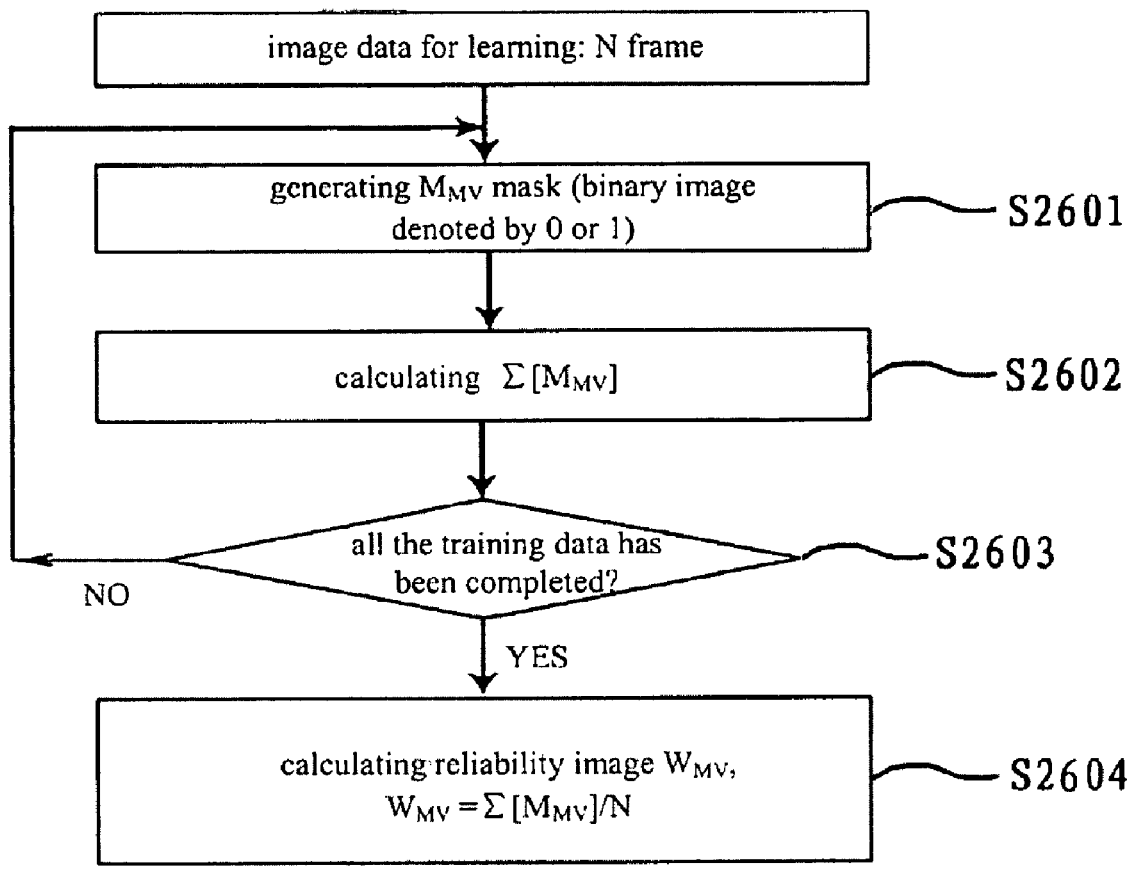
FIGS. 26(a) and 26(b) illustrate the estimation method for the moving reliability image $W_{MV}$.
Figure 26:
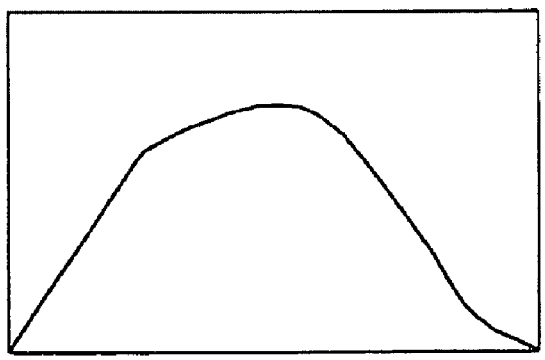

FIGS. 26(a) and 26(b) illustrate the estimation method of the moving reliability image $W_{MV}$ which is used for eliminating the incorrect detection of shot change involving a moving person. Generally, during zooming-in, for the scene where a moving video camera is used for tracking a player, the incorrect detection of shot change occurs frequently. In view of this problem, to further decrease the incorrect detection rate, such image scene is used as training data, it is possible to calculate the moving reliability image $W_{MV}$ indicating the moving feature of a person within the image according to the motion information reliability mask obtained as above. As shown in FIG. 26(a), at first, the $M_{MV}$ mask (binary image denoted by 0 or 1) is generated (S2601), and $\Sigma[M_{MV}]$ is calculated (S2602). Then, it is determined whether all the training data have been over (S2603), if YES, the reliability image is calculated according to $W_{MV} = \Sigma[M_{MV}]/N$ (S2604), and if NO, it returns to step S2601. FIG. 26(b) illustrates an example of $W_{MV}$.

The calculation method of $M_{MV}$ is as follows: only the images of video camera panel including a person are collected, the moving reliability is calculated with the same method, and the moving region with reliability is used as mask. As a result, since a person are present near to the central portion of the picture more frequently (which is concluded by a statistic process), as shown in FIG. 26(b), the mask having the moving region with reliability is obtained in the vicinity of the picture centre.

Eventually, the reliability value FL can be calculated according to the following equation (8) by using the above moving reliability mask $M_{MV}$ and the reliability image $W_{MV}$, the reliability value FL is calculated as follow (equation (8)) it is possible to use the estimation value as a feature to determine whether there is an incorrect detection of shot change. Herein, the threshold value Thd01 for determining whether there is an incorrect detection of shot change is obtained through training data.

$$F_L(t) = \sum_{i=1}^{N_V} \sum_{j=1}^{N_H} [W_{MV}(i,j,t) \cdot M_{MV}(i,j,t)] \Big/ \sum_{i=1}^{N_V} \sum_{j=1}^{N_H} M_{MV}(i,j,t) \qquad \text{Equation (8)}$$

So far, the method for eliminating the shot incorrect detection has been described.

Figure 27:
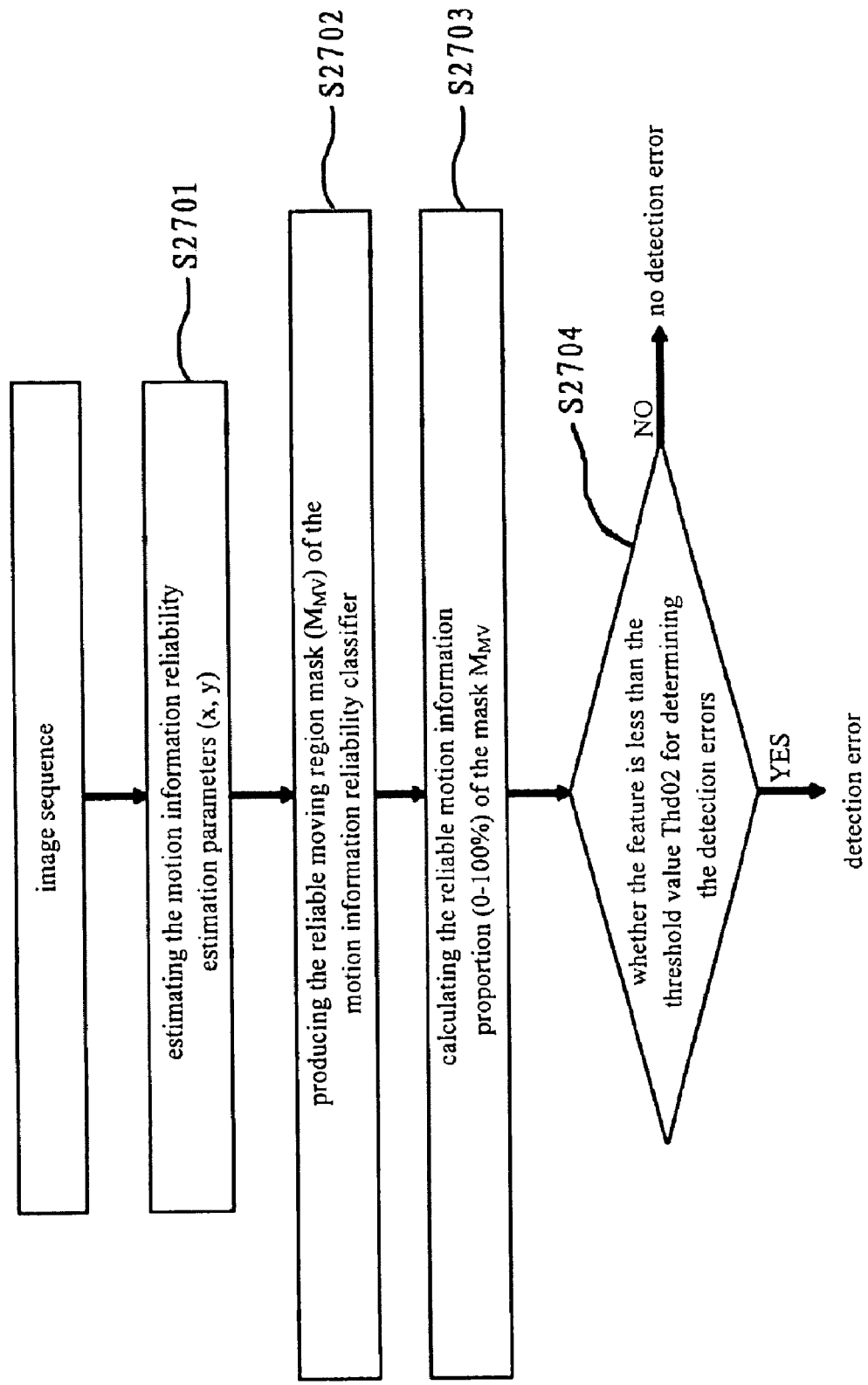
FIG. 27 illustrates a method for improving the shot detection error which can not be detected by using the feature of the region-of-interest and the color feature.

FIG. 27 illustrates an improvement method for the shot detection error that can not be determined the color feature and the region-of-interest feature with the above motion information. Similarly to FIG. 23, firstly, the motion information reliability estimation parameters (x, y) are estimated (S2701), and the reliable moving region mask ($M_{MV}$) of the motion information reliability classifier is calculated (S2702). Afterwards, as shown in Equation (9), the reliable motion information proportion (0-100%) of the mask $M_{MV}$ is calculated as feature FP (S2703), and then it is determined whether the feature is less than the threshold value Thd02 for determining the detection errors (S2704). In the case that the feather is less than the threshold value Thd02, it is determined as an detection error of shot change, and on the contrary, it is determined as no detection error.

$$F_P(t) = \sum_{i=1}^{N_V} \sum_{j=1}^{N_H} M_{MV}(i,j,t)/(N_H \times N_V) \qquad \text{Equation (9)}$$

The threshold value Thd02 herein for determining whether there is a detection error is obtained through training data.

Figure 28:
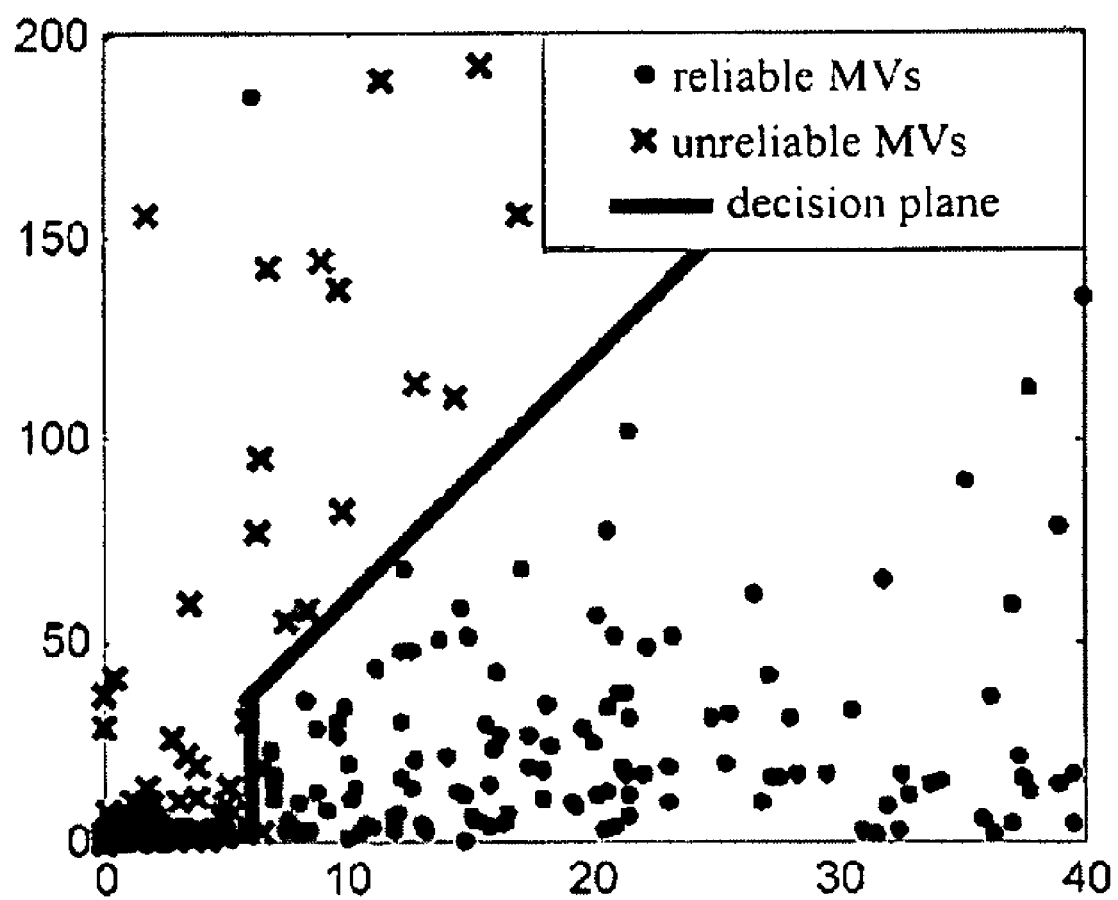
FIG. 28 illustrates the reliability estimation value of the reliability classifier which makes use of the motion information obtained through training data.

FIG. 28 illustrates the reliability estimation value when the feature (x, y) of the above motion information reliability estimation is estimated by using the motion information reliability identifying device which is obtained through training data.

Figure 29:
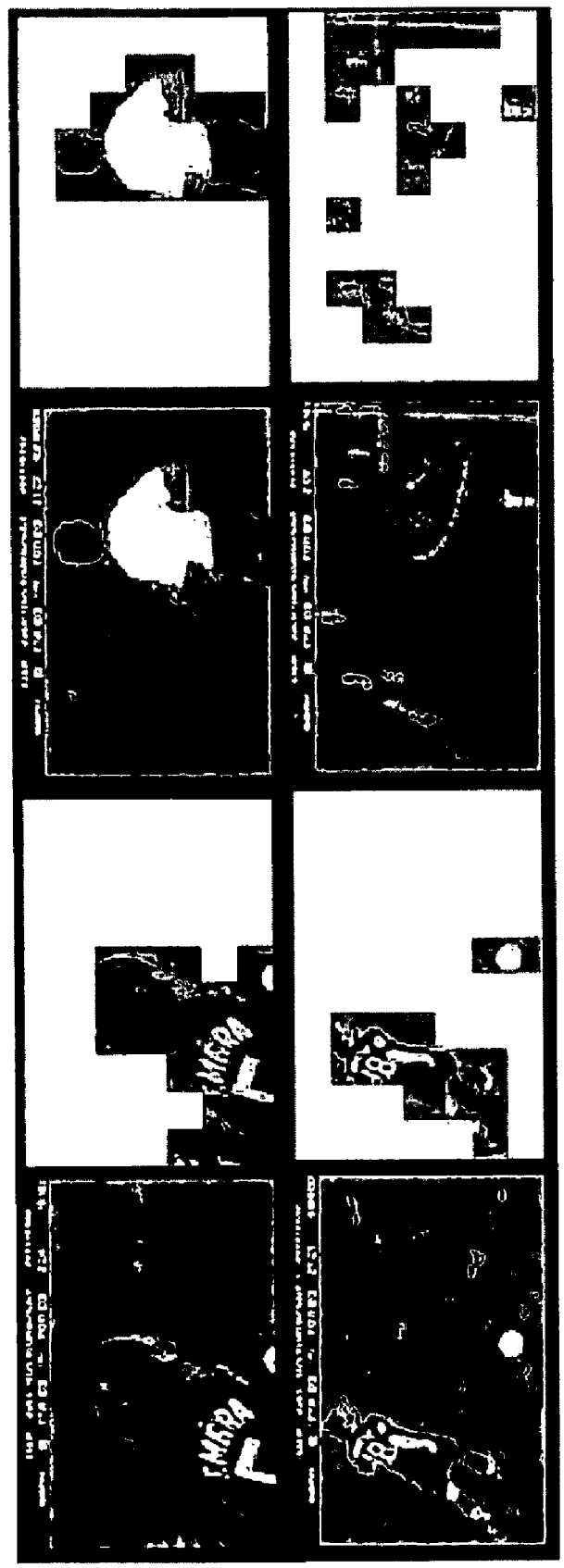
FIG. 29 illustrates the detection result which is produced by using the above method to detect the reliable action region in an actual image.

FIG. 29 illustrates the detection result detected by the above method wherein it is detected that the real image includes the reliability action region. As seen from the detection result, it is possible to confirm the detection on the person motion information to be high reliability. In addition, the reliability that the background variation caused by the video camera movement is detected as an action is low.

Figure 30:
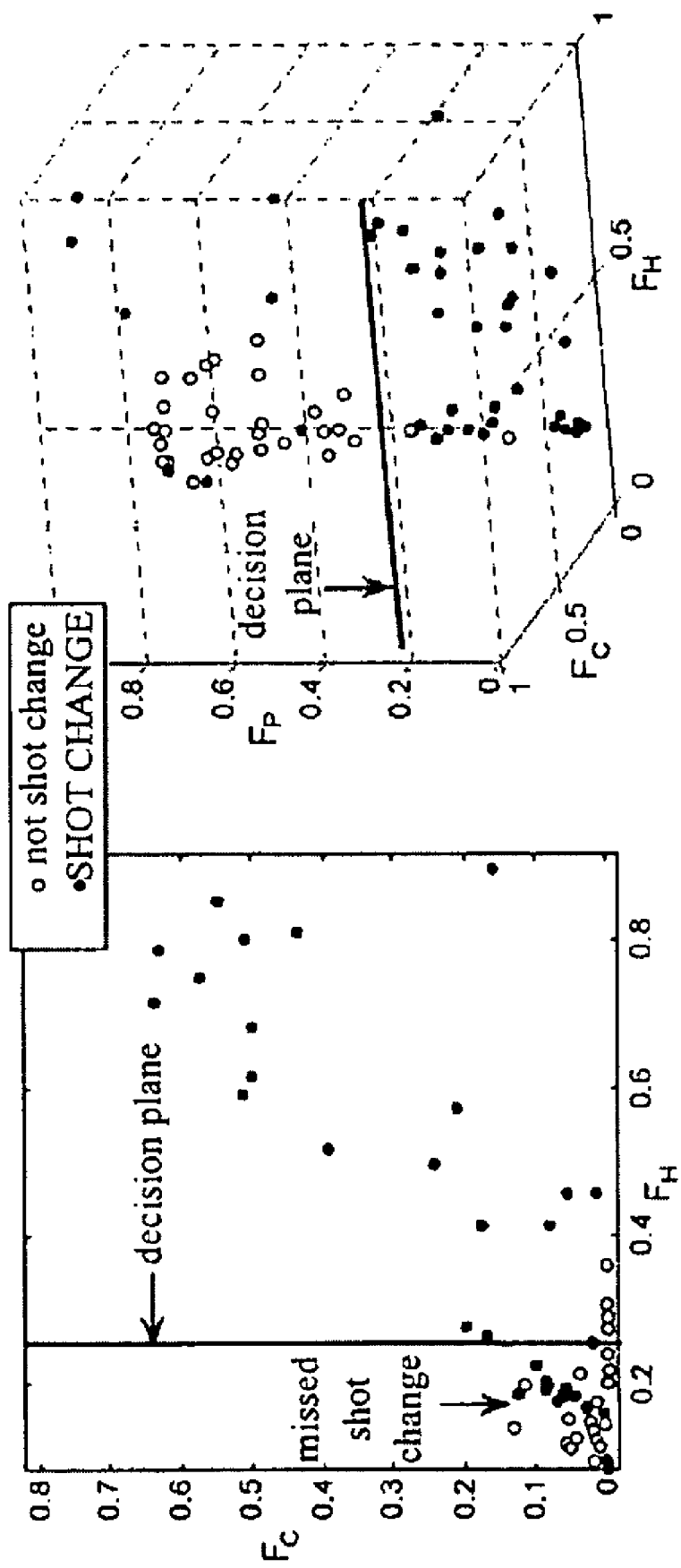
FIG. 30 shows that the shot change which was a "detection error" is correctly detected.

In FIG. 30, for the "detection error" which can not be detected by the shot change detection method based on the color feature, according to the motion information reliability estimation, the shot change of the "detection error" can be correctly determined by using the feature FP in which the proportion of the reliable motion information of the moving reliability mask $M_{MV}$ is used as the feature.

Figure 31:
Figure 31:
Figure 31:
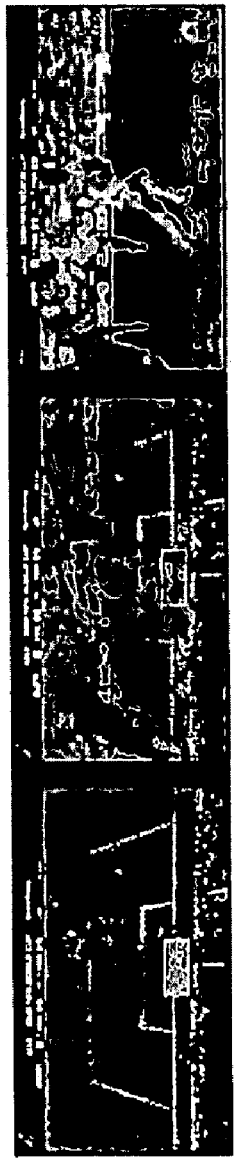

FIGS. 31(a) to 31(c) illustrate the result indicating the shot change detected by the above method. In FIG. 31(a), in the case that the shot change is incorrectly detected by using the color feature, such incorrect detection can be eliminated by using the motion information reliability in the present method. In addition, in FIGS. 31(b) and 31(c), even when using the motion information reliability estimation, the shot change correctly detected by using the color feature is still determined as true shot change.

Figure 32:
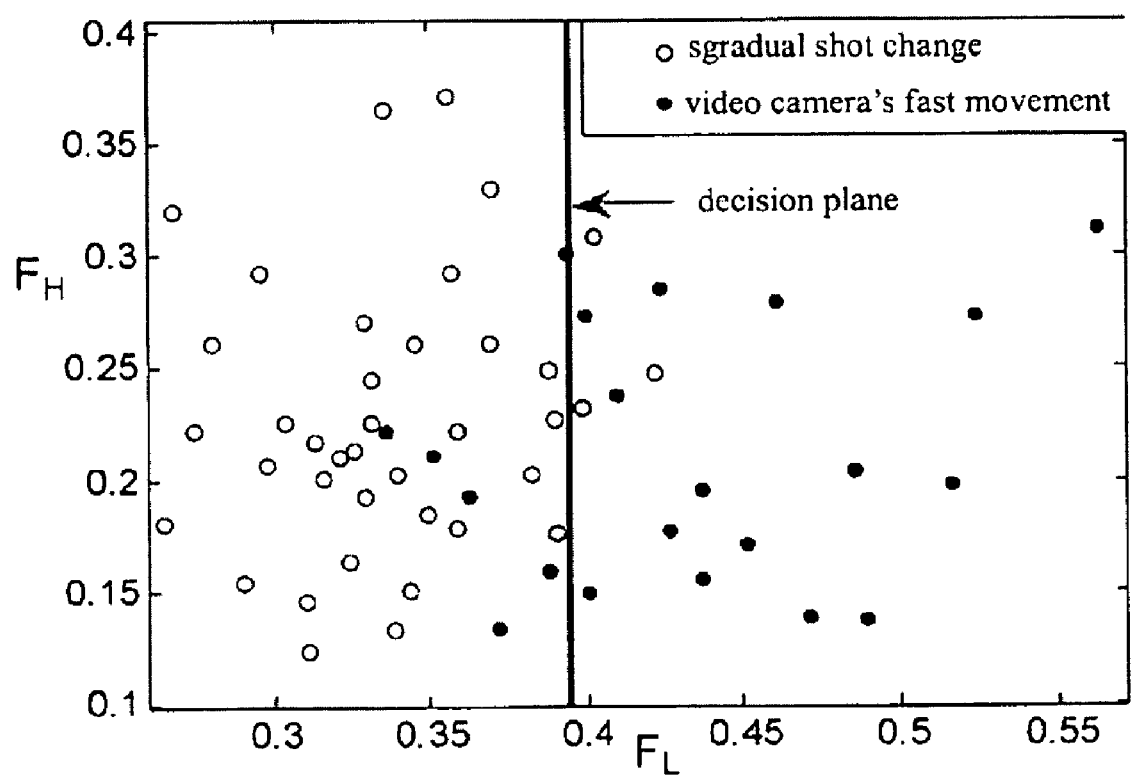
FIG. 32 shows that the incorrect detection can be eliminated by using an identification function and the features obtained by the training data.

In FIG. 32, in the case that the video camera's fast movement induces an incorrect detection, such incorrect detection can be eliminated to a certain extent by using the identification function obtained through training data and the feature FL proposed in the present invention.

The individual shot changes in image are detected by the above method, thereby identifying the type of the respective shots (which include 4 types, i.e., the long shot, the medium shot, the close shot, and the out-of-field shot). According to the relevant feature between adjacent shots, the feature mutual relation between individual frames within the shot (such as the view position and the moving direction) and the object feature in the individual images (e.g. the goal region, the corner kick, the player and the like), it is possible to determine exciting scenes such as the corner kick, the free kick, the goal kick and so on.

The advantageous effects of the present invention are set forth as below.

(1) The present invention detects the region of interested color reliably by using the color distribution feature, thereby detecting the object and the shot change in the moving image of a soccer game and the like, and the automatic analysis on the image content can be made by adding such results as Meta information.

(2) In order to increase the reliability with respect to the video camera horizontal movement and the person's horizontal movement, the whole image is divided into a plurality of regions, and it is possible to perform the shot change detection with high accuracy by using the color distribution feature in each region and the dimensional feature of the region-of-interest.

(3) Furthermore, by estimating the reliability of the motion information within images, it is possible to detect the shot change and the like that can not be detected on the basis of the color distribution feature and the dimensional feature of region-of-interest in the above (2) with higher accuracy.

(4) In addition, by estimating the reliability of the motion information within images, it is possible to eliminate the shot change which is incorrectly detected on the basis of the color distribution feather and the dimensional feature of region-of-interest in the above (2), thereby enhancing the accuracy of detecting the shot change.

(5) Using the detection result of the object in image and the high-accuracy detection result of shot change, it is finally possible to extract various exciting scenes in video and automatically produce the digest images.

(6) In the present invention, by using the color distribution feature, the color feature of the region-of-interest, and the moving feature simultaneously, it is possible to detect the shot change in the moving image of a soccer game and the like.

(7) The classification for each shot change can be made by using the object feature in the region-of-interest.

Additionally, the present invention may be embodied in various modifications within the scope of the present technical concept.

The above description is only the preferable embodiments of the present invention which is not intended to limit the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A moving image analyzing apparatus, comprising:
   a moving image reading means for reading a moving image;
   a region-of-interest extracting means for extracting a region-of-interest from each frame in the moving image;
   a motion information with reliability extracting means for calculating motion information with reliability;
   an object feature extracting means for extracting an object feature in the region-of-interest or a region adjacent to the region-of-interest; and
   a shot change detecting means for detecting a shot change on the basis of the differences of a color feature of the moving image, the object feature of the region-of-interest, motion information among the images of each frame, and the calculated motion information with reliability, wherein
   the shot change detecting means assigns a binarized reliability template to the motion information on the basis of the calculated motion information with reliability.

2. The moving image analyzing apparatus according to claim 1, further comprising:
   a shot classifying means for classifying shots obtained on the basis of the detection result of the shot change detecting means.

3. The moving image analyzing apparatus according to claim 1, wherein
   the region-of-interest extracting means determines whether the region-of-interest is present in each frame by using an image feature of the region-of-interest obtained through pre-training.

4. The moving image analyzing apparatus according to claim 3, wherein
   the image feature of the region-of-interest is based on a HSV histogram model.

5. The moving image analyzing apparatus according to claim 1, wherein
   after the region-of-interest extracting means extracts the region-of-interest, the object feature extracting means automatically extracts the object feature in the region-of-interest or the region adjacent to the region-of-interest.

6. The moving image analyzing apparatus according to claim 1, wherein
   the shot change detecting means calculates reliability estimation feature parameters for estimating the reliability of the motion information by calculating the motion information between two adjacent frames and fitting the motion information into a quadric model.

7. The moving image analyzing apparatus according to claim 6, wherein the shot change detecting means:
   acquires a match estimation value by calculating the match of the individual pixel positions within a searched region and corresponding individual pixel positions within the same searched region in two adjacent frames,
   fits the acquired match estimation value into the quadric model so as to calculate the parameters of the quadric model, and
   calculates the reliability estimation feature parameters based on the quadric model.

8. The moving image analyzing apparatus according to claim 7, wherein
   the shot change detecting means calculates a moving reliability parameter on the basis of a reliability template for a plurality of motion information, and
   the shot change detecting means calculates a reliability estimation value indicating whether the shot change detection result is reliable, on the basis of the binarized reliability template and the moving reliability parameter.

9. A digest automatic producing system, comprising:
   the moving image analyzing apparatus according to any one of claims 1-5 and 6-8; and
   a digest automatic producing means for automatically producing a digest on the basis of the analysis result of the moving image analyzing apparatus.

10. An exciting scene automatic extracting system, comprising:
   the moving image analyzing apparatus according to any one of claims 1-5 and 6-8; and
   an exciting scene automatic extracting means for automatically extracting an exciting scene on the basis of the analysis result of the moving image analyzing apparatus, wherein
   an exciting scene is a predetermined scene type defined by relevant features between adjacent shots, mutual relationships between individual frames within the adjacent shots, and the object features present in the adjacent shots.

11. A moving image analyzing method, comprising:
   reading a moving image;
   extracting a region-of-interest from each frame in the moving image;
   calculating motion information with reliability;
   extracting an object feature in the region-of-interest or a region adjacent to the region-of-interest; and detecting a shot change on the basis of the differences of a color feature of the moving image, the object feature of the region-of-interest, motion information among the images of each frame, and the calculated motion information with reliability, wherein a binarized reliability template is assigned to the motion information on the basis of the calculated motion information with reliability.

12. The moving image analyzing method according to claim 11, further comprising:

classifying shots obtained on the basis of the detected shot change.

13. The moving image analyzing method according to claim 11, wherein a presence of the region-of-interest to be extracted in each frame is determined by using an image feature of the region-of-interest obtained through pre-training.

14. The moving image analyzing method according to claim 13, wherein the image feature of the region-of-interest is based on a HSV histogram model.

15. The moving image analyzing method according to claim 11, wherein after the region-of-interest is extracted, the object feature is automatically extracted in the region-of-interest or the region adjacent to the region-of-interest in the object feature extracting step.

16. The moving image analyzing method according to claim 11, wherein reliability estimation feature parameters for estimating the reliability of the motion information are calculated by calculating the motion information between two adjacent frames and fitting the motion information into a quadric model.

17. The moving image analyzing method according to claim 16, wherein a match estimation value is acquired by calculating the match between individual pixel positions within a searched region and corresponding individual pixel positions within the same searched region in two adjacent frames, the acquired match estimation value is fitted into the quadric model so as to calculate the parameters of the quadric model, and the reliability estimation feature parameters are calculated based on the quadric model.

18. The moving image analyzing method according to claim 17, wherein a moving reliability parameter is calculated on the basis of a reliability template for a plurality of motion information, and a reliability estimation value indicating whether the detection result of the shot change detecting step is reliable is calculated, based on the binarized reliability template and the moving reliability parameter.

19. A moving image analyzing apparatus, comprising:

a moving image reading unit configured to read a moving image;

a region-of-interest extracting unit configured to extract a region-of-interest from each frame in the moving image;

a motion information with reliability extracting unit configured to calculate motion information with reliability;

an object feature extracting unit configured to extract an object feature in the region-of-interest or a region adjacent to the region-of-interest; and a shot change detecting unit configured to detect a shot change on the basis of the differences of a color feature of the moving image, the object feature of the region-of-interest, motion information among the images of each frame, and the calculated motion information with reliability, wherein the shot change detecting unit assigns a binarized reliability template to the motion information on the basis of the calculated motion information with reliability.

* * * * *